United States Patent
Sharma et al.

(10) Patent No.: US 10,447,489 B2
(45) Date of Patent: Oct. 15, 2019

(54) COMMUNICATION METHOD AND SYSTEM FOR MBMS INTEREST INDICATION COMMUNICATION

(71) Applicant: NEC Corporation, Minato-ku, Tokyo (JP)

(72) Inventors: Vivek Sharma, London (GB); Yuhua Chen, London (GB)

(73) Assignee: NEC CORPORATION, Tokyo (JP)

( * ) Notice: Subject to any disclaimer, the term of this patent is extended or adjusted under 35 U.S.C. 154(b) by 185 days.

(21) Appl. No.: 15/112,774

(22) PCT Filed: Jan. 23, 2015

(86) PCT No.: PCT/JP2015/052602
§ 371 (c)(1),
(2) Date: Jul. 20, 2016

(87) PCT Pub. No.: WO2015/115578
PCT Pub. Date: Aug. 6, 2015

(65) Prior Publication Data
US 2016/0380779 A1    Dec. 29, 2016

(30) Foreign Application Priority Data
Jan. 31, 2014    (GB) .................................. 1401701.6

(51) Int. Cl.
*H04L 12/18*    (2006.01)
*H04W 4/06*    (2009.01)
(Continued)

(52) U.S. Cl.
CPC ........ *H04L 12/189* (2013.01); *H04L 63/1466* (2013.01); *H04W 72/1215* (2013.01);
(Continued)

(58) Field of Classification Search
CPC ...................................................... H04W 4/06
See application file for complete search history.

(56) References Cited

U.S. PATENT DOCUMENTS

2002/0159444 A1    10/2002    Vialen et al.
2010/0067484 A1    3/2010    Kagimoto et al.
(Continued)

FOREIGN PATENT DOCUMENTS

CN    101102592 A    1/2008
CN    101523807 A    9/2009
(Continued)

OTHER PUBLICATIONS

3rd Generation Partnership Project, TSG-RAN WG2 #81, R2-130314, Agenda Item 7.2, LG Electronics Inc. "Connectivity Models for Small Cell Enhancement", St. Julian's, Malta, Jan. 28-Feb. 1, 2013, whole document.
(Continued)

*Primary Examiner* — Kent K Krueger

(57) ABSTRACT

A system is provided in which a user device communicates control data with a first base station and communicates user data with a second base station. The user device receives, from the first base station, configuration data specific to the first base station and configuration data specific to the second base station for configuring the user device to handle in-device coexistence interference. When the user device detects interference, it identifies the base station to which the interference relates, and controls the operating of its transceiver circuitry: i) using the first base station specific configuration data if it identifies that the interference is related to the first base station; and ii) using the second base station specific configuration data if it identifies that the interference is related to the second base station.

4 Claims, 10 Drawing Sheets

(51) Int. Cl.
H04W 72/12 (2009.01)
H04L 29/06 (2006.01)
H04W 24/02 (2009.01)
H04W 88/06 (2009.01)
H04W 12/12 (2009.01)
H04W 92/10 (2009.01)
H04W 84/20 (2009.01)
H04W 76/27 (2018.01)

(52) U.S. Cl.
CPC ............ *H04W 12/12* (2013.01); *H04W 24/02* (2013.01); *H04W 76/27* (2018.02); *H04W 84/20* (2013.01); *H04W 88/06* (2013.01); *H04W 92/10* (2013.01)

(56) References Cited

U.S. PATENT DOCUMENTS

| | | | |
|---|---|---|---|
| 2010/0091667 | A1 | 4/2010 | Kazmi et al. |
| 2010/0246520 | A1 | 9/2010 | Andersson |
| 2012/0039229 | A1 | 2/2012 | Etemad et al. |
| 2014/0308921 | A1 | 10/2014 | Zhang |
| 2014/0341188 | A1 | 11/2014 | Chang et al. |
| 2016/0080339 | A1 | 3/2016 | Zhang et al. |

FOREIGN PATENT DOCUMENTS

| | | |
|---|---|---|
| CN | 101677447 A | 3/2010 |
| CN | 101874363 A | 10/2010 |
| CN | 102651847 A | 8/2012 |
| CN | 103188663 A | 7/2013 |
| EP | 2852240 A1 | 3/2015 |
| JP | 2003-524336 A | 8/2003 |
| WO | 2013/111905 A1 | 8/2013 |
| WO | 2014015478 A1 | 1/2014 |

OTHER PUBLICATIONS

Japanese Office Action for JP Application No. 2016-549541 dated Jun. 28, 2017 with English Translation.
3rd Generation Partnership Project; Technical Specification Group Radio Access Network; "Scenarios and requirements for small cell enhancements for E-UTRA and E-UTRAN (Release 12)", 3GPP TR 36.932, V12.1.0, Mar. 2013.
3rd Generation Partnership Project; Technical Specification Group Radio Access Network; "Evolved Universal Terrestrial Radio Access (E-UTRA) and Evolved Universal Terrestrial Radio Access Network (E-UTRAN); Overall description; Stage 2 (Release 12)", 3GPP TS 36.300, V12.0.0, Dec. 2013.
3rd Generation Partnership Project; Technical Specification Group Radio Access Network; "Evolved Universal Terrestrial Radio Access (E-UTRA); Radio Resource Control (RRC); Protocol specification (Release 12)", 3GPP TS 36.331, V12.0.0, Dec. 2013.
Huawei et al: "Security for SCE arc.1A", 3GPP Draft; S3-140026 Security for SCE ARC.1A, 3rd Generation Partnership Project (3GPP), Mobile Competence Centre ; 650, Route Des Lucioles ; F-06921, Sophia-Antipolis Cedex ; France, vol. SA WG3, No. Taipei; Jan. 20, 2014-Jan. 24, 2014, Jan. 19, 2014, XP050745165, Cited in ISR.
3rd Generation Partnership Project; Technical Specification Group Services and System Aspects; "3GPP System Architecture Evolution (SAE); Security architecture (Release 12)", 3GPP Standard; 3GPP TS 33.401, 3rd Generation Partnership Project (3GPP), Mobile Competence Centre ; 650, Route Des Lucioles ; F-06921 Sophia-Antipolis Cedex ; France, vol. SA WG3, No. v12.10.0, Dec. 19, 2013, XP050729135, Cited in ISR.
Hiroyuki Ishii et al: "A novel architecture for LTE-B : C-plane/U-plane split and Phantom Cell concept", 2012 IEEE Globecom Workshops (GC Wkshps 2012) : Anaheim, California, USA, Dec. 3-7, 2012, IEEE, Piscataway, NJ, Dec. 3, 2012, XP032341446, Cited in ISR.
New Postcom: "RRM and mobility enhancements of small cell deployment scenarios", 3GPP Draft; R2-130271_RRM and Mobility Enhancements of Small Cell Deployment Scenarios, 3rd Generation Partnership Project (3GPP), Mobile Competence Centre ; 650, Route Des Lucioles ; F-06921 Sophia-A, vol. RAN WG2, No. St. Julian; Jan. 28, 2013-Feb. 1, 2013, Jan. 19, 2013, XP050668306, Cited in ISR.
LG Electronics Inc; "Autonomous denial for multiple serving cells"; 3GPP Draft; R2-125797; 3rd Generation Partnership Project (3GPP), Mobile Compltence Centre ; 650, route des Lucioles ; F-06921 Sophia-Antipolis Cedex ; France; XP050667512, Nov. 3, 2012, Cited in GBSR.
HTC; "Physical Layer Considerations on Dual Connectivity"; 3GPP Draft; R1-133261; Aug. 10, 2013; 3rd Generation Partnership Project (3GPP), Mobile Competence Centre; 650, route des Lucioles ; F-06921 Sophia-Antipolis Cedex ; France, XP050716418, Cited in GBSR.
United Kingdom Search Report for GB Patent Application No. GB1401701.6.
International Search Report for PCT Application No. PCT/JP2015/052602, dated Jul. 22, 2015.
Written opinion of the International Searching Authority for PCT Application No. PCT/JP2015/052602.
Chinese Office Action for CN Application No. 201580006805.X dated Oct. 24, 2018 with English Translation.
Communication dated Dec. 12, 2018, from the Japanese Patent Office in counterpart application No. 2018-023773.
Kyocera, "MBMSInterestIndication considerations for CSG cells", 3GPP TSG-RAN WG2#78 R2-122790, Internet<URL: http://www.3gpp.org/ftp/tsg_ranNVG2_RL2/TSGR2_78/Docs/ R2-122790.zip>, May 25, 2012 (3 pages total).
NEC Corporation, "One RRC entity versus multiple RRC entities", 3GPP TSG-RAN WG2#83 R2-132669, Internet<URL: http://www.3gpp.org/ftp/tsg_ran/VVG2_RL2iTSGR2_83/Docs/ R2-132669.zip>, Aug. 23, 2013 (5 pages total).
NEC Corporation, "RRC messages over X2 for DC", 3GPP TSG-RAN WG2#85 R2-140619, Internet<URL: http:// www.3gpp.org/ftp/tsg_ranNVG2_RL2/TSGR2 85/Docs/ R2-140619.zip>, Feb. 14, 2014 (6 pages total).
Chinese Office Action for CN Application No. 201580006805.X dated May 9, 2019 with English Translation.

COMMUNICATION METHOD AND SYSTEM FOR MBMS INTEREST INDICATION COMMUNICATION

This application is a National Stage Entry of PCT/JP2015/052602 filed on Jan. 23, 2015, which claims priority from United Kingdom Patent Application 1401701.6 filed on Jan. 31, 2014, the contents of all of which are incorporated herein by reference, in their entirety.

TECHNICAL FIELD

The present invention relates to radio access networks in a cellular or wireless telecommunications network, and particularly but not exclusively to networks operating according to the 3GPP standards or equivalents or derivatives thereof. The invention has particular although not exclusive relevance to the Long Term Evolution (LTE) of UTRAN (called Evolved Universal Terrestrial Radio Access Network (E-UTRAN)) and to exchanging information between base stations serving a user communication device communicating with such networks.

BACKGROUND ART

In a cellular communications network, user communication devices (also known as User Equipment (UE) or mobile terminals, such as mobile telephones) communicate with remote servers or with other user communication devices via base stations. An LTE base station is also known as an 'enhanced NodeB' (eNB). When a user communication device attaches to the LTE network via a base station, a core network entity called Mobility Management Entity (MME) sets up a default Evolved Packet System (EPS) Bearer between the user communication device and a gateway in the core network. An EPS Bearer defines a transmission path through the network and assigns an IP address to the user communication device to be used by the user communication device to communicate with remote servers or other user communication devices. An EPS Bearer also has a set of data transmission characteristics, such as quality of service, data rate and flow control parameters, which are defined by the subscription associated with the user communication device and are established by the MME upon registration of the user communication device with the network.

The EPS Bearer is thus managed by the MME, which signals to the user communication device when it needs to activate, modify, or deactivate a particular EPS Bearer. Thus there are two connections between the user communication device and the communication network: one for the user data transmitted using the established EPS bearer (also known as the user plane or U-plane) and another one for managing the EPS Bearer itself (also known as the control plane or C-plane)

In order to optimise utilisation of their bandwidth, LTE base stations receive periodic signal measurement reports from each served user communication device, which contain information about the perceived signal quality on a given frequency band used by (or being a candidate frequency band for) that user communication device. These signal measurement reports are then used by the base stations in their decision to allocate certain parts of their bandwidth to the served user communication devices and also to hand over user communication devices to other base stations (or other frequency bands/other radio access technologies (RATs)) when the signal quality does not meet the established criteria. The handing over of a user communication device might be necessary, for example, when the user communication device has moved away from the given base station, and also when an interference problem has arisen.

The 3GPP TR 36.932 (v.12.1.0) specification defines so-called small cell enhancement scenarios. 'Small cells' in this context refer to the coverage areas of low-power nodes (for example Pico eNBs or Femto eNBs) that are being considered for LTE in order to support mobile traffic explosion, especially for indoor and outdoor hotspot deployments. A low-power node generally refers to a node that is operating a cell ('small cell') with a typical transmit power which is lower than typical transmit powers used in cells of macro nodes and base stations ('macro cells').

Some of the small cell enhancement scenarios are based on a split control-plane/user-plane architecture (referred to as 'C/U Split'), in which the user communication device is configured to maintain its control plane connection with the communication network via a macro cell (operating as a primary cell Tcell' or primary cell group "PCG") and at the same time maintain its user plane connection via one or more 'small cells' (operating as secondary cell 'Scell' or secondary cell group "SCG") and thereby reducing the load in the macro cell. Effectively, in this case the user communication device is using two separate radio connections via two separate nodes (i.e. a macro base station and a low-power node), one for sending/receiving user data, and another one for controlling the user communication device's operations, such as mobility management, security control, authentication, setting up of communication bearers, etc. In this case, the node handling the control-plane (e.g. a macro base station) is referred to as a master base station (MeNB) whilst the node handling the user-plane (e.g. a pico base station) is referred to as the secondary base station (SeNB). Of course not all user plane data may be transmitted through the SeNB; some user plane data may also be transmitted via the MeNB.

Current user communication devices typically support multiple radio technologies, not only LTE. The user communication devices might include, for example, transceivers and/or receivers operating in the Industrial, Scientific and Medical (ISM) radio bands, such as Bluetooth or Wi-Fi transceivers. Furthermore, user communication devices might also include positioning functionality and associated circuitry, for example Global Navigation Satellite System (GNSS) transceivers and/or receivers. Both ISM and GNSS (hereafter commonly referred to as non-LTE) radio technologies use frequency bands close to or partially overlapping with the LTE frequency bands. Some of these non-LTE frequency bands are licensed for a particular use (e.g. Global Positioning Systems (GPS) bands) or might be unlicensed bands and can be used by a number of radio technologies (such as Bluetooth and Wi-Fi standards using the same range of ISM frequency bands). The manner in which these non-LTE frequency bands are used are, therefore, not covered by the LTE standards and are not controlled by the LTE base stations.

However, transmissions in the non-LTE frequency bands might, nevertheless, still cause undesired interference to (or suffer undesired interference resulting from) transmissions in the LTE bands, particularly in the overlapping or neighbouring frequency bands. When interference arises as a result of communication occurring concurrently in the same user communication device (for example, concurrent use of LTE and non-LTE radio technologies) the interference is sometimes referred to as 'in-device coexistence (IDC) interference' which causes an 'in-device coexistence (IDC) situation'. Such an IDC situation can be addressed by the user communication device (possibly with assistance by the serving base station), which is referred to as an IDC solution.

In C/U Split scenarios, the serving base stations (e.g. the MeNB and the SeNB) can exchange (over the X2 interface provided between them) information relating to the configuration of the user communication devices they are serving using appropriately formatted RRC containers (inter node messages). In other words, the base stations can include RRC messages within the X2 messages sent between the base stations. The RRC containers may be used, in particular, for procedures relating to: IDC situations; counter check; (UE specific) information request/response; broadcast/multicast services (e.g. for providing an indication of interest in a service); measurement configuration and reporting and/or the like.

SUMMARY OF INVENTION

Technical Problem

In C/U Split scenarios, communication problems (e.g. interference) may occur on either radio connection (and/or on an ISM connection). However, the user communication device is configured to maintain its control-plane with the macro base station, and hence it can only receive its IDC configuration ('idc-config') settings (if any) from the macro base station. Such IDC configuration settings can be adapted to handle IDC situations arising in the macro cell (which carries the control plane only, in case of C/U-plane split) and/or in the small cell (which carries the user plane). Further, the user communication device can send an IDC assistance indication directly to the macro base station (via the control plane connection), and send an IDC assistance indication indirectly to the small cell base station that is handling the user plane connection, via the macro base station.

However, such IDC procedures and other similar procedures that involve a user communication device and multiple base stations (e.g. counter-check procedures, network setup, provision of broadcast/multicast services, and/or the like) require complex signalling between the various entities involved. In some case, it is not possible to apply existing procedures for each base station as the user communication device only has a control-plane connection with the macro base station.

Solution of Problem

The inventors have therefore identified a need to improve the communications between such network entities when a C/U Split is in place.

In one aspect, the invention provides a secondary base station device configured to provide user plane connectivity to a user device whilst control plane connectivity is provided to the user device by a master base station device, the secondary base station device comprising: a base station interface for communicating with the master base station device; and a control module configured to initiate a counter check procedure for a radio bearer associated with the user device and terminated in the secondary base station by generating control data for transmission to the user device and by transmitting the control data to the master base station device via the base station interface, the control data comprising at least one count value indicating an amount of data transmitted to or received from the user device on the radio bearer for use in checking for packet insertion by another device.

The control module might be arranged to receive a counter check response message from the user device via the master base station device over said base station interface and is arranged to process the response message to determine whether or not a security breach has occurred and if so, to initiate a bearer release procedure.

The control data might comprise a radio resource control, RRC, message for the user device requesting the user device to verify the amount of data received by or transmitted from the user device on the radio bearer.

The control module might be arranged to initiate the bearer release procedure by sending a message to the master base station device via the base station interface, requesting that the master base station release the radio bearer and/or to allocate a new radio bearer.

In one aspect, the present invention provides a master base station device configured to provide control plane connectivity to a user device whilst user plane connectivity is provided to the user device by a secondary base station device, the master base station device comprising: a base station interface for communicating with the secondary base station device; and a control module configured to receive control data relating to the user device from the secondary base station device over the base station interface, the control data for initiating a counter check procedure for a radio bearer associated with the user device and terminated in the secondary base station, the control data comprising at least one count value indicating an amount of data transmitted to or received from the user device on the radio bearer for use in checking for packet insertion by another device; wherein the control module is further configured to generate a counter check control message containing said at least one count value for transmission to the user device to cause the user device to perform a counter check procedure; and transceiver circuitry for transmitting the counter check control message to the user device, and for receiving a counter check response from the user device.

The transceiver circuitry might be operable to transmit the counter check response to the secondary base station device via said base station interface.

The control module might be configured to receive a bearer release request from the secondary base station and is configured to release the requested bearer and/or to allocate a new radio bearer between the secondary base station and the user device.

The control module might be arranged to cipher the counter check control message containing the at least one count value from the secondary base station device.

In one aspect, the present invention provides a master base station device configured to provide control plane connectivity to a user device whilst user plane connectivity is provided to the user device by a secondary base station device, the master base station device comprising: a base station interface for communicating with the secondary base station device; and means for receiving a desired multimedia broadcast/multicast service, MBMS, interest indication message from the user device; means for determining that the MBMS service is to be provided by a cell of the secondary base station which is not currently serving the user device; means for sending the MBMS interest indication message to the secondary base station; means for adding the cell that will provide the MBMS service to a group of secondary base station cells that are currently serving the user device or for handing over the user device from a current serving cell of the secondary base station to the secondary base station cell that will provide the MBMS service.

In one aspect, the present invention provides a secondary base station device configured to provide user plane connectivity to a user device whilst control plane connectivity is provided to the user device by a master base station device, the secondary base station device comprising: a base station interface for communicating with the master base station device; means for receiving a desired multimedia broadcast/multicast service, MBMS, interest indication message from the user device from the master base station device; and means for adding the cell that will provide the MBMS service to a group of secondary base station cells that are currently serving the user device or for changing a current serving cell for the user device to the secondary base station cell that will provide the MBMS service.

In one aspect, the present invention provides a method performed by a secondary base station device configured to provide user plane connectivity to a user device whilst control plane connectivity is provided to the user device by a master base station device, the secondary base station device comprising: a base station interface for communicating with the master base station device; and a control module configured to initiate a counter check procedure for a radio bearer associated with the user device and terminated in the secondary base station by generating control data for transmission to the user device and by transmitting the control data to the master base station device via the base station interface, the control data comprising at least one count value indicating an amount of data transmitted to or received from the user device on the radio bearer for use in checking for packet insertion by another device.

The control module might be arranged to receive a counter check response message from the user device via the master base station device over said base station interface and is arranged to process the response message to determine whether or not a security breach has occurred and if so, to initiate a bearer release procedure.

In one aspect, the present invention provides a method performed by a master base station device configured to provide control plane connectivity to a user device whilst user plane connectivity is provided to the user device by a secondary base station device, the method comprising: receiving control data relating to the user device from the secondary base station device over a base station interface, the control data for initiating a counter check procedure for a radio bearer associated with the user device and terminated in the secondary base station, the control data comprising at least one count value indicating an amount of data transmitted to or received from the user device on the radio bearer for use in checking for packet insertion by another device; generating a counter check control message containing said at least one count value for transmission to the user device to cause the user device to perform a counter check procedure; and transmitting the counter check control message to the user device, and for receiving a counter check response from the user device.

The method might comprise transmitting the counter check response to the secondary base station device via said base station interface.

The method might further comprise ciphering the counter check control message containing the at least one count value from the secondary base station device.

In one aspect, the present invention provides a method performed by a master base station device configured to provide control plane connectivity to a user device whilst user plane connectivity is provided to the user device by a secondary base station device, the method comprising: receiving a desired multimedia broadcast/multicast service, MBMS, interest indication message from the user device; determining that the MBMS service is to be provided by a cell of the secondary base station which is not currently serving the user device; sending the MBMS interest indication message to the secondary base station; and adding the cell that will provide the MBMS service to a group of secondary base station cells that are currently serving the user device or handing over the user device from a current serving cell of the secondary base station to the secondary base station cell that will provide the MBMS service.

In one aspect, the present invention provides a method performed by a secondary base station device configured to provide user plane connectivity to a user device whilst control plane connectivity is provided to the user device by a master base station device, the method comprising: receiving a desired multimedia broadcast/multicast service, MBMS, interest indication message from the user device from the master base station device; and adding the cell that will provide the MBMS service to a group of secondary base station cells that are currently serving the user device or changing a current serving cell for the user device to the secondary base station cell that will provide the MBMS service.

Aspects of the invention extend to corresponding methods and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

BRIEF DESCRIPTION OF DRAWINGS

Embodiments of the invention will now be described, by way of example, with reference to the accompanying drawings in which.

DESCRIPTION OF EMBODIMENTS

Overview

Figure 1:
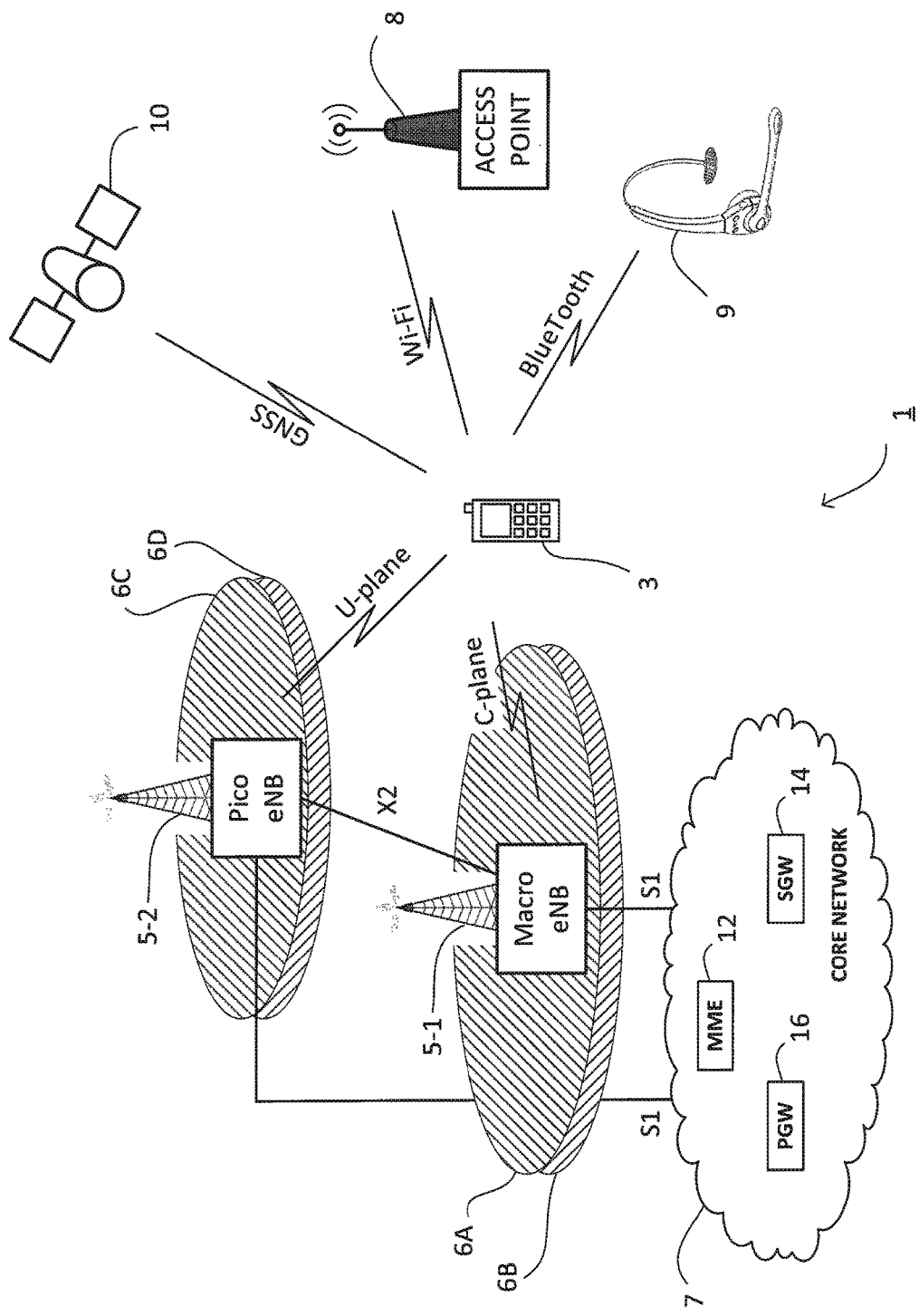
FIG. 1 schematically illustrates a mobile telecommunication system of a type to which the invention is applicable.

FIG. 1 schematically illustrates a mobile (cellular) telecommunication system 1 in which users of communication devices 3 (for example mobile telephones) can communicate with other users via each of a plurality of base stations 5-1, 5-2 operating a plurality of cells 6A to 6D, and a core network 7. In the system illustrated in FIG. 1, base station 5-1 is a macro base station operating macro cells 6A and 6B, and base station 5-2 is a pico base station (or other low-power node) operating cells 6C and 6D. Further base stations (not shown) might operate according to different standards, such as the Wideband Code Division Multiple Access (W-CDMA) or the GSM (Global System for Mobile Communications) EDGE (Enhanced Data rates for GSM Evolution) Radio Access Network (GERAN) standards or the like.

Each cell 6A to 6D has a number of uplink and downlink communications resources (channels, sub-carriers, time slots, etc.) that are available for wireless communication between the user communication device 3 and the corresponding base station 5. In this embodiment, it will be assumed, for the sake of simplicity of explanation, that the user communication device 3 has one control plane connection (e.g. via cell 6A) and one user plane connection (e.g. via cell 6C) with the respective base stations 5-1 and 5-2, although, in deployed systems, a user communication device 3 might have multiple user plane connections and multiple control plane connections with several base stations in parallel. In this example, the Radio Access Technologies (RATs) employed by the base stations 5 operate according to either Frequency Division Duplexing (FDD) or Time Division Duplexing (TDD).

In TDD, the time domain of a communication channel (of a base station 5) is divided into several recurrent time slots of fixed length in which communication to/from the base station 5 can be scheduled. In operation in TDD, two or more data streams may be transferred between the base station 5 and the user communication device(s) 3, apparently simultaneously, in sub-channels of one communication channel, by scheduling each data stream in different time slots of the channel (effectively 'taking turns'). In FDD, the bandwidth available to the base station 5 is divided into a series of non-overlapping frequency sub-bands each comprising frequency resources that may be assigned to user communication devices 3 for communication via the base station 5.

The serving base station 5 allocates downlink resources to the user communication device 3 depending on the amount of data to be sent to the device. Similarly, the base station 5 allocates uplink resources to the user communication device 3 depending on the amount and type of data the user communication device 3 has to send to the base station 5. The uplink and downlink resources typically comprise physical resource blocks (PRBs) which are blocks of frequency resources in the frequency range used by that particular base station 5.

In this embodiment, the user communication device 3 supports separate control plane and user plane connections (C/U Split) with the macro base station 5-1 and the pico base station 5-2, respectively. When operating in this split C/U mode, the macro base station 5-1 is sometimes referred to as the MeNB and the pico base station 5-2 is sometimes referred to as the SeNB. The C/U Split functionality may be triggered by the macro base station 5-1 e.g. due to current network load, signal conditions reported by the user communication device 3, etc. Therefore, the macro base station 5-1, when it determines that C/U Split functionality would be favourable (and that it is supported by the user communication device 3), selects a suitable low-power node (such as the pico base station 5-2) and sets up a new (or moves the existing) user plane connection for that user communication device 3 to the selected node 5-2 (but keeps the control plane connection for this user communication device 3 routed via itself).

As will become apparent from the following description, the embodiments aim to increase the messaging capabilities between the master base station 5-1 and the pico base station 5-2 to facilitate better operation of the system when operating in this C/U split mode. In particular, the base stations 5 are configured to communicate, over the X2 interface, using a different protocol (such as the RRC protocol), which is normally reserved for use over the air interface between the user communication device 3 and its serving base station 5. Beneficially, the use of X2 RRC containers allows control plane functionality to be provided between the pico base station 5-2 and the user communication device 3 via the macro base station 5-1, which in turn allows for better optimisation of the communications between the user communication device 3, the macro base station 5-1, and the pico base station 5-2.

In-device Coexistence Situations

In this embodiment, the user communication device 3 is also capable of communicating using non-LTE radio technologies such as those which use resources of the Industrial, Scientific and Medical (ISM) frequency bands. For example, the user communication device 3 can communicate with a Wi-Fi access point 8 of a Wireless Local Area Network (WLAN) (not shown) operating according to one of the 802.11 family of standards defined by the Institute of Electrical and Electronics Engineers (IEEE). The user communication device 3 can also communicate with a wireless headset 9 operating according to e.g. the Bluetooth standard defined by the Bluetooth Special Interest Group (SIG). In addition, the user communication device 3 also supports positioning technologies and thus communicates with, for example, a positioning satellite 10 using GPS signals.

Communications between the user communication device 3 and the access point 8, the wireless headset 9, and/or the positioning satellite 10 might occur substantially concurrently with the communication between the user communication device 3 and the base station(s) 5, which concurrent communication has the potential to cause undesirable interference (i.e. IDC interference).

Figure 2:
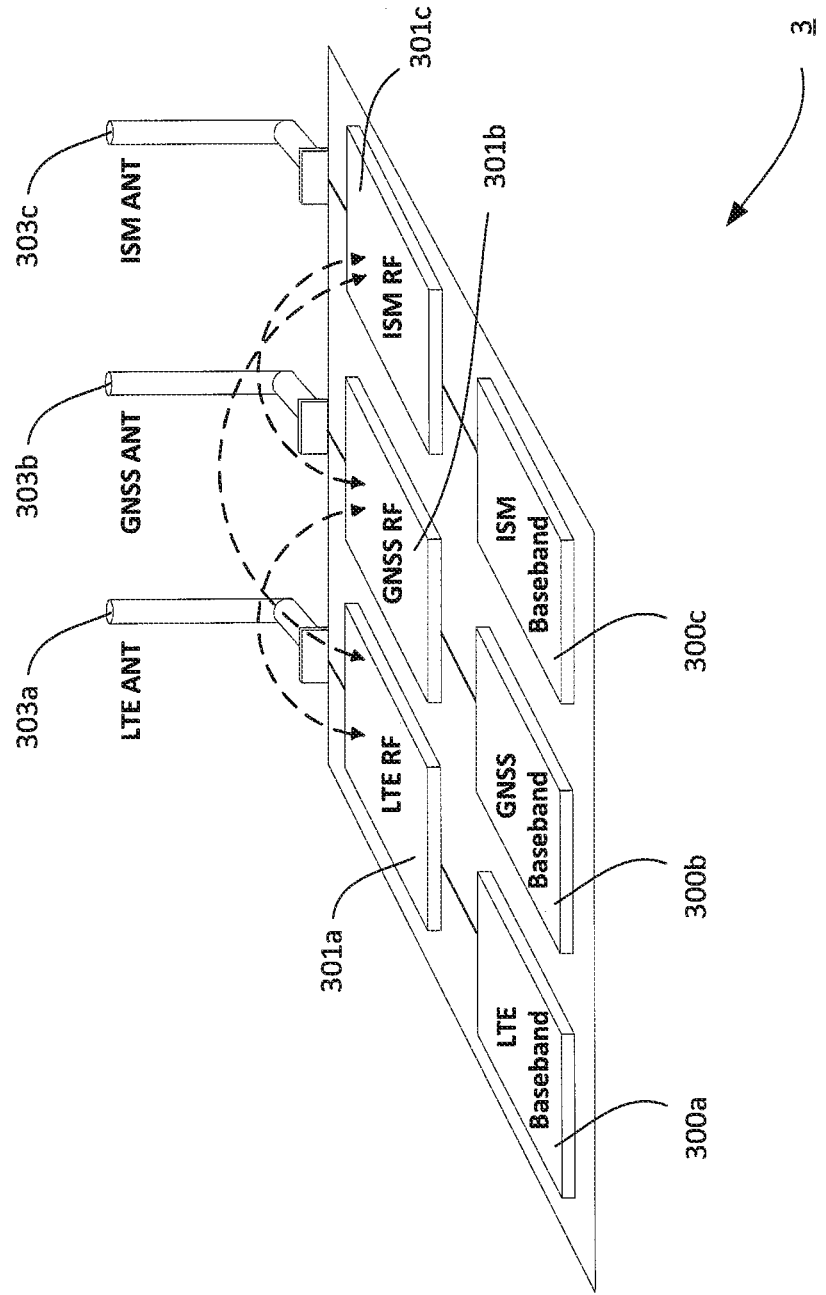
FIG. 2 schematically illustrates various radio transceiver circuits implemented in a user communication device of the mobile telecommunication system shown in FIG. 1.

The issue of IDC interference is illustrated further in FIG. 2 which schematically illustrates, purely illustratively, the various radio transceiver circuits implemented in a user communication device 3 shown in FIG. 1. As shown in FIG. 2, the user communication device 3 comprises an LTE baseband circuit 300a, a GNSS baseband circuit 300b, and an ISM baseband circuit 300c. Each baseband circuit 300a to 300c is coupled to a radio frequency (RF) transceiver (or receiver), i.e. LTE transceiver 301a, GNSS transceiver 301b, and ISM transceiver 301c, respectively. Communications in the LTE band are carried out using an LTE antenna 303a. Similarly, communications in the non-LTE bands are carried out using the respective GNSS antenna 303b and/or the ISM antenna 303c.

Transmissions in the non-LTE frequency bands might cause undesired interference to (or suffer undesired interference resulting from) transmissions in the LTE bands, particularly in the overlapping or neighbouring frequency bands. For example, as indicated by dashed arrows in FIG. 2, any of the transceivers 301a to 301c might suffer interference from either one of the other transceivers operating in the same user communication device 3.

It is noted, however, that the non-LTE radio technologies might be used by the user communication device 3 itself or by other communication devices in its vicinity and, although these radio technologies conform to the relevant standards (i.e. other than LTE), might still cause undesired interference to (or suffer interference from) the LTE transmission of the user communication device 3. This is especially true when the end user is operating an ISM transceiver 301b/301c in parallel with the LTE transceiver 301a, for example when the user is making a voice over IP (VoIP) call using a Bluetooth headset 9. It will be appreciated that in this case the LTE and ISM transmissions will interfere with each other as the LTE voice data received from the base station is relayed to the headset 9 using the ISM transceiver 301c implemented in the same user communication device 3.

In another typical scenario, the LTE transceiver 301a of the user communication device 3 can cause interference to the GNSS receiver 301b (e.g. a GPS receiver) making it difficult to obtain a current location of the user communication device 3. In this case, although there is no apparent disruption to the LTE signal (the signal quality measurements by the user communication device 3 would indicate acceptable signal conditions), the LTE transmissions by the user communication device 3 would be likely to render the GNSS functionality unusable because of the interference caused by the LTE transceiver 301a to the GNSS receiver 301b of the user communication device 3.

In order to be able to alleviate the problems due to IDC interference, the user communication device 3 indicates its IDC capability to its serving base station 5. If the received IDC capability of the user communication device 3 indicates that the user communication device 3 is capable of taking at least some IDC interference mitigation actions, then the serving base station 5 configures the user communication device (by providing a so-called 'idc-config' settings) to address IDC interference autonomously. Therefore, when the user communication device 3 experiences interference due to an IDC situation, it can adjust its LTE and/or non-LTE transmissions in accordance with the 'idc-config' settings, thereby reducing or eliminating the experienced interference. In particular, the user communication device 3 is allowed by the network to 'deny' (i.e. suspend or delay) its (already scheduled and hence expected) LTE transmissions up to a limit/rate specified in the 'idc-config' parameters. Essentially, this allows the user communication device 3 to temporarily override the LTE scheduling decisions made by the network 1 and to carry out ISM signalling whilst its LTE transmissions are 'autonomously' suspended.

However, some IDC interference situations cannot be solved by the user communication device 3 by itself, even if an 'idc-config' has been provided by the base station 5. In this case, the user communication device 3 may need to send an IDC indication to the network (e.g. in an uplink RRC message) to inform the network about the IDC situation. To address such situations, the 3GPP standards define three techniques that the network (i.e. an LTE base station) is able to use to try solve the IDC situation when the user communication device 3 cannot solve the problem by itself. The three techniques comprise: a TDM (Time Division Multiplexing) solution, an FDM (Frequency Division Multiplexing) solution, and a Power Control solution. The TDM solution ensures that the transmission of a radio signal does not coincide with the reception of another radio signal. The FDM solution consists of choosing another serving frequency for the user communication device than the one suffering from interference. The Power Control solution aims to reduce radio transmission power to mitigate the effect of interference.

Further details of these techniques can be found in section 23.4 of the 3GPP TS 36.300 standards document (v.12.0.0). Details of the 'idc-config' settings can be found in the 3GPP TS 36.331 standards document (v.12.0.0). The contents of both documents are incorporated herein by reference.

User Communication Device

Figure 3:
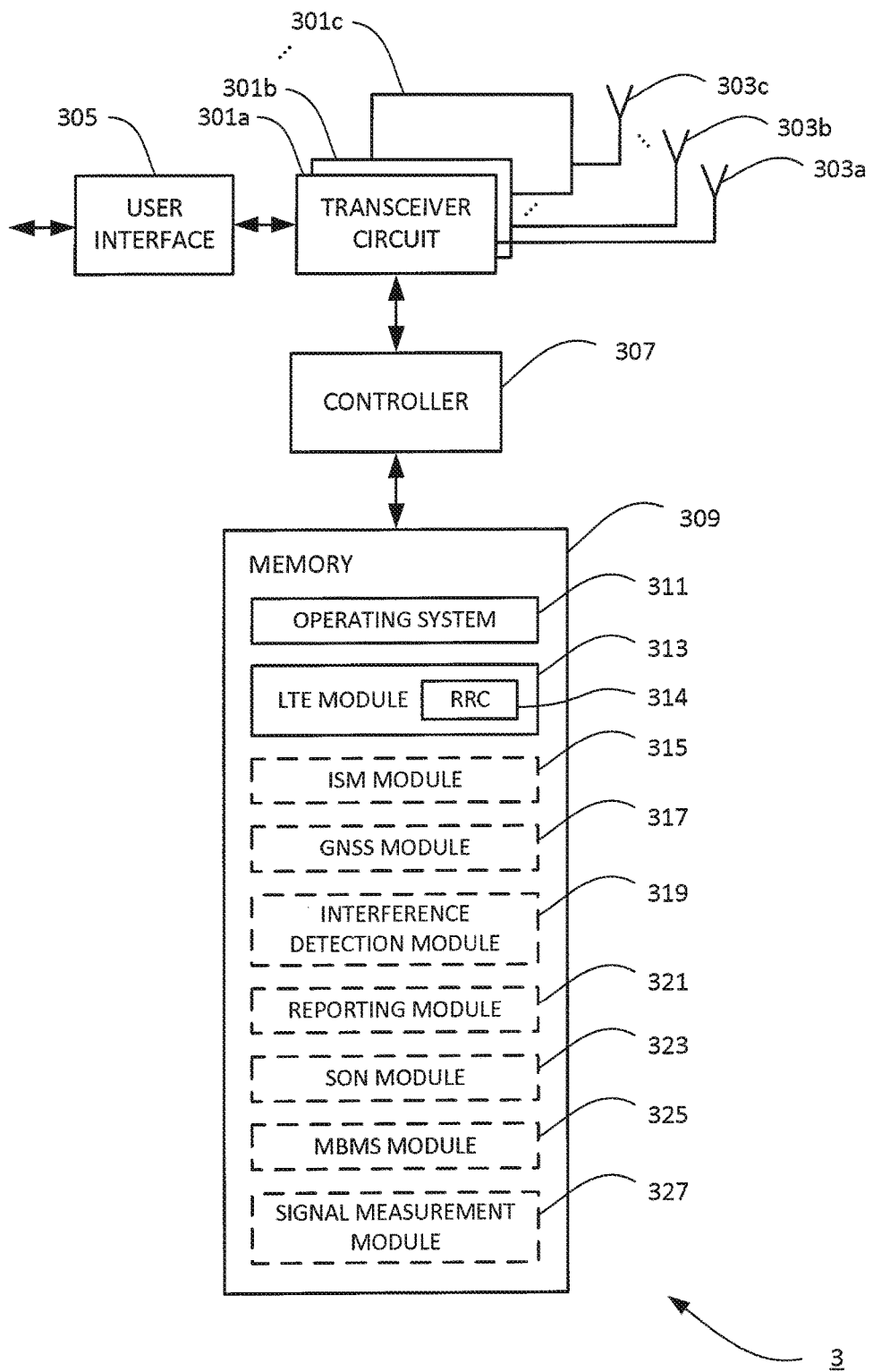
FIG. 3 is a block diagram of a user communication device forming part of the mobile telecommunication system shown in FIG. 1.

FIG. 3 is a block diagram of a user communication device 3 forming part of the mobile telecommunication system 1 shown in FIG. 1. As shown, the user communication device 3 includes transceiver circuits 301a to 301c which are operable to transmit signals to and to receive signals from (via one or more associated antennas 303a to 303c) a base station 5, a positioning satellite 10, and an access point, respectively. The user communication device 3 also includes a user interface 305 that is controlled by a controller 307 and which allows a user to interact with the user communication device 3.

The controller 307 controls the operation of the transceiver circuits 301a to 301c in accordance with software and data stored in memory 309. The software includes, among other things, an operating system 311, an LTE module 313, an RRC module 314, an ISM module 315, a GNSS module 317, an interference detection module 319, a reporting module 321, a SON module 323, an MBMS module 325, and a signal measurement module 327. It will be appreciated that modules 315 to 327 (shown in dashed lines) in FIG. 3 are optional.

The LTE module 313 controls the communications of the user communication device 3 using the LTE radio technologies. The LTE module 313 receives instructions from the base station 5 (via the LTE transceiver circuit 301a and the LTE antenna 303a) and stores them in the memory 309. Based on the received instructions, the LTE module 313 is operable to select the appropriate frequency band, transmission power, modulation mode etc. used in the LTE communications. The LTE module 313 is also operable to update the base station 5 about the amount and type of uplink and/or downlink data scheduled for transmission in order to assist the base station 5 in allocating resources among the user communication devices it is serving.

The LTE module 313 includes an RRC module 314 for handling (i.e. to generate, send, and receive) RRC signalling messages between the user communication device 3 and its serving base station(s) 5. As will be described in more detail below, when a C/U-split has been configured for the user communication device 3, the RRC module 314 communicates RRC signalling with the pico base station 5-2 (which handles the user-plane) indirectly, i.e. via the macro base station 5-1.

The LTE module 313 also includes a data counter (not shown) for counting the amount of data transmitted via each transmitter circuit 301a to 301c. When requested by the base station 5, the RRC module 314 includes information relating to the amount of transmitted data (provided by the data counter) in a suitable RRC message sent to the requesting base station 5.

The ISM module 315, if present, controls the ISM communications of the user communication device 3. In doing so, the ISM module 315 might, for example, use data received from the access point 8 and/or communicate with the wireless headset 9.

The GNSS module 317, if present, obtains a current geographic location of the user communication device 3 and controls the GNSS communications of the user communication device 3. In doing so, the GNSS module 317 might, for example, use data received from the positioning satellite 10.

Apart from any received control data, default control parameters might be stored in the memory 309 and might be used by any of the LTE/ISM/GNSS modules 313 to 317 to control communications of the user communication device 3 as appropriate.

The interference detection module 319, if present, is operable to detect interference caused to communications by the LTE module 313, the ISM module 315, and the GNSS module 317. In particular, the interference detection module is operable to detect interference that has arisen due to coexisting communications by any of the LTE module 313, the ISM module 315, and the GNSS module 317. The interference detection module 319 may detect interference, e.g. by performing signal measurements, such as reference signal received power (RSRP), received power received quality (RSRQ) measurements, and the like. The interference detection module 319 may also detect interference by monitoring operation of the transceiver circuits 301a to 301c, for example to establish a measure of bit rate (or error rate, error count) for communications using the transceiver circuits 301a to 301c.

The reporting module 321, if present, is operable to generate and send IDC assistance information to the base station 5. In order to do so, the reporting module 321 is operable to obtain data from the LTE module 313, the ISM module 315, the GNSS module 317, the interference detection module 319, and/or the signal measurement module 327, as appropriate. The reporting module 321 indicates the occurrence of in-device interference by sending an associated message to the base station 5 via the LTE transceiver 301a. The message may comprise a dedicated radio resource control (RRC) message (e.g. an RRC InDeviceCoexistence Indication message or the like) although any appropriate signalling may be used. The reporting module 321 is also operable to generate and send, to the base station 5, measurement reports including the measurement results provided by the signal measurement module 327.

The SON module 323, if present, controls functionalities relating to communications with self-organising networks. For example, the SON module 323 communicates configuration data with the serving base station 5 for the purpose of setting up a SON involving the user communication device 3. In particular, the SON module 323 may send information identifying whether or not the user communication device 3 supports the SON functionality.

The MBMS module 325, if present, controls communications using broadcast/multicast signalling. In particular, the MBMS module 325 controls the reception of MBMS services transmitted via the cells 6 of the base stations 5. The MBMS module 325, e.g. prior to receipt of a particular MBMS service, may provide an indication to one of the base stations 5 identifying an interest of a user (of the user communication device 3) in receiving that MBMS service. Such indication of interest may be sent, for example, when requested by one of the base stations 5 and/or autonomously by the user communication device 3 (e.g. upon a change in the user's interest).

The signal measurement module 327 performs signal measurements according to the measurement configuration provided by the network (e.g. a base station 5). The signal measurement module 327 also sends (via the reporting module 321) the results of the measurement to the base station 5.

Base Station

Figure 4:
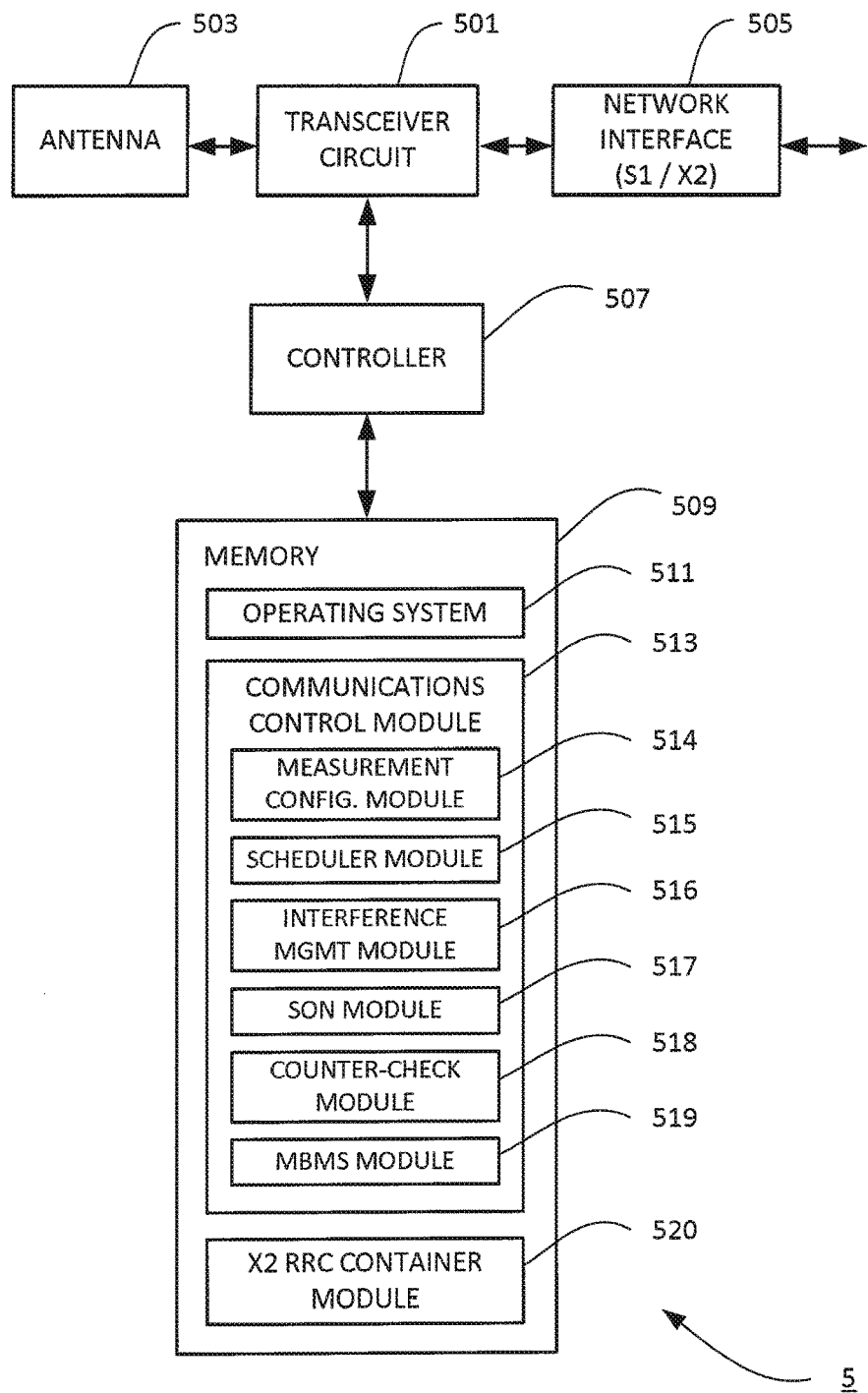
FIG. 4 is a block diagram of a base station forming part of the mobile telecommunication system shown in FIG. 1.

FIG. 4 is a block diagram of a base station 5 forming part of the mobile telecommunication system 1 shown in FIG. 1. The illustrated base station 5 is generic and may be either the macro base station 5-1 or the pico base station 5-2. As shown, the base station 5 includes a transceiver circuit 501 which is operable to transmit signals to and to receive signals from the user communication devices 3 via one or more antennas 503 and to transmit signals to and receive signals from the core network 7 and other base stations 5 via the network interfaces 505 (which may be a copper or optical fibre interface). The connection to the core network 7 is via the S1 interface and the connection to other base stations is via the X2 interface. A controller 507 controls the operation of the transceiver circuit 501 in accordance with software and data stored in memory 509. The software includes, among other things, an operating system 511, a communication control module 513, and an X2 RRC container module 520. Optionally, the communication control module 513 may further include a measurement configuration module 514, a scheduler module 515, an interference management module 516, a SON module 517, a counter-check module 518, and an MBMS module 519.

The communication control module 513 controls communications between the base station 5 and external devices via the transceiver circuitry 501 and the one or more antenna 503.

The measurement configuration module 514 configures signal measurements for the user communication device 3, e.g. by generating, sending, and receiving appropriately formatted (RRC) messages. The measurement configuration module 514 is operable to request the user communication device 3 to carry out one or more signal measurements and report back the results of such measurements. In order to do so, the measurement configuration module 514 is operable to provide a suitable information element (e.g. a 'measconfig' IE) in a message sent to the user communication device 3. The measurement configuration module 514 is also responsible for processing any measurement result obtained from the user communication device 3 and to request the communication control module 513 (based on the measurement results) to initiate handover for the user communication device 3, when appropriate.

The scheduler module 515 receives and processes requests from the user communication devices 3 for allocation of uplink and downlink resources. The scheduler module 515 is also operable to obtain information from the interference management module 516 identifying any interference reduction actions and takes these into account when allocating resources to the affected user communication devices 3.

The interference management module 516 receives and handles the assistance information from the user communication devices 3. The interference management module 516 also obtains the information relating to the capabilities, preferences, and operating parameters of neighbouring base stations 5 which is then stored in memory 509. The interference management module 516 is also operable to determine, based on the obtained assistance information and the information obtained from the neighbouring base stations 5, appropriate action to be taken to reduce IDC interference at the user communication device 3 for example by managing the allocation of time and/or frequency resources to the user communication devices 3 served by this base station 5 and/or by another base station (in case of C/U Split is in place).

The SON module 517, if present, controls functionalities relating to the base station's 5 communications with self-organising networks. For example, the SON module 517 communicates configuration data with other base stations 5 and/or the user communication device 3 for the purpose of setting up a SON involving the base station 5. In particular, the SON module 517 may receive information identifying whether or not a particular base station 5 and/or user communication device 3 supports the SON functionality.

The counter-check module 518 obtains (e.g. upon request) information relating to the amount of data transmitted and/or received by the user communication device 3 and to verify whether or not the amount of data sent by or transmitted to the user communication device 3 matches the amount of data received from/transmitted by the base station 5 (or a further base station connected to it, e.g. in case of C/U Split is in place).

The MBMS module 519, if present, controls communications using broadcast/multicast signalling. In particular, the MBMS module 519 controls the transmission of MBMS services via the cells of the base station 5. The MBMS module 519, e.g. prior to transmitting a particular MBMS service, may obtain an indication identifying an interest of a user (of the user communication device 3) in receiving that MBMS service. Such indication of interest may be received from the user communication device 3, for example, upon request by the base station 5 or upon request by another base station 5 (e.g. in case of C/U Split is in place), although such indication may also be sent autonomously by the user communication device 3 (e.g. upon a change in the user's interest).

The X2 RRC container module 520 handles (generates, sends, and receives) X2 RRC containers for communicating with neighbouring base stations 5 and/or the user communication device 3 in case of C/U Split is in place. The X2 RRC container module 520 facilitates transmission of RRC messages (indirectly) between a user communication device 3 and an SeNB 5-2 serving the user communication device 3 by including appropriately formatted RRC messages in X2 messages that are transmitted via the MeNB 5-1.

In the above description, the user communication device 3 and the base station 5 are described for ease of understanding as having a number of discrete modules (such as the communications control modules and the LTE/ISM/GNSS modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

C/U Split Architecture

Figure 5:
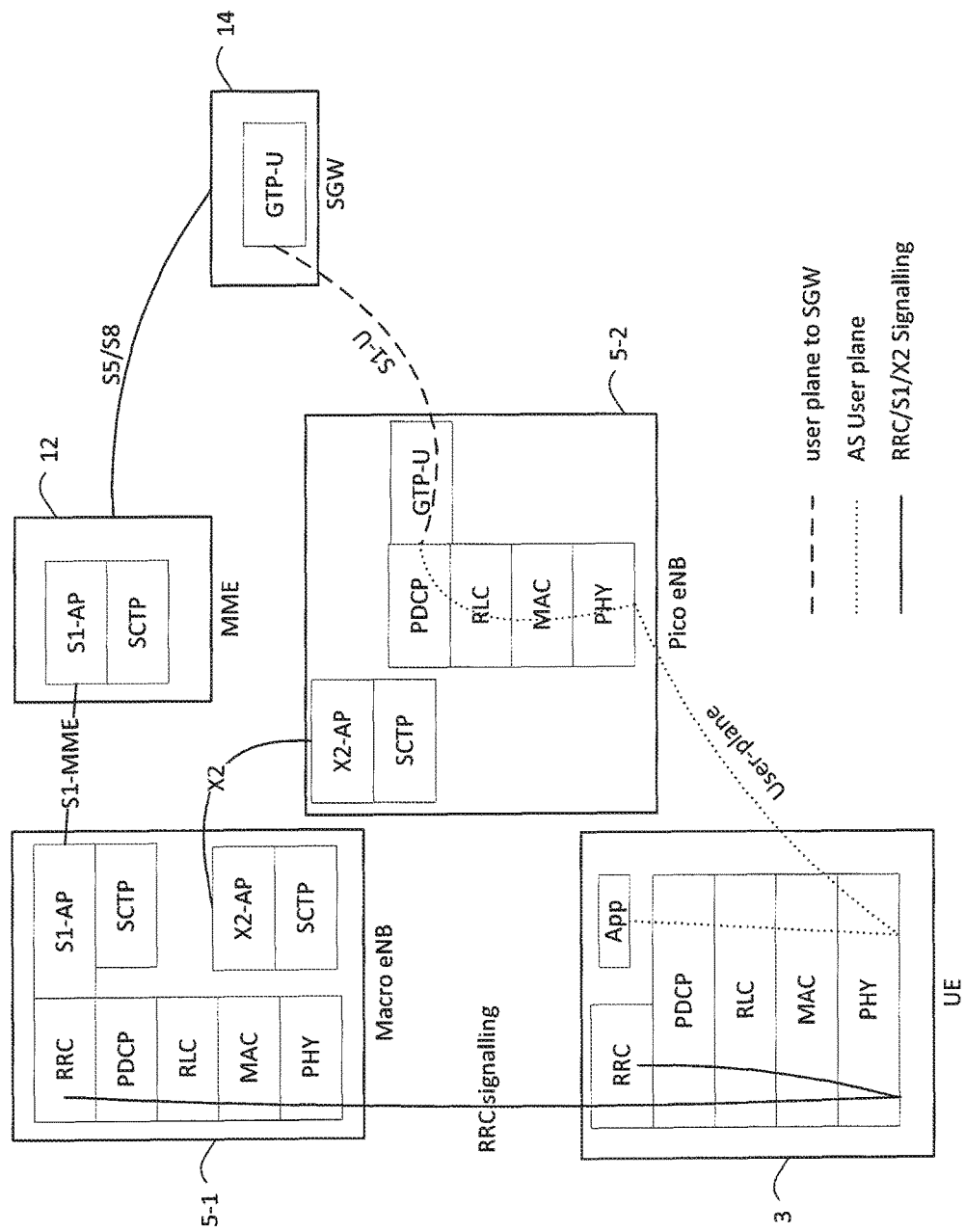
FIG. 5 is an exemplary overview of the elements of the telecommunication system shown in FIG. 1 when a split control plane/user plane functionality is in place.

FIG. 5 is an overview of the elements of the telecommunication system 1 shown in FIG. 1 for implementing split control plane/user plane functionality. FIG. 5 also shows the respective protocol stacks of these network elements.

As can be seen in this figure, the control plane connection is provided between the Mobility Management Entity (MME) 12 and the macro base station 5-1 using S1-MME signalling (via the S1 interface) and between the macro base station 5-1 and the user communication device 3 using RRC signalling (via the air interface).

On the other hand, the user plane connection is provided between the core network 7 and the pico base station 5-2 (via the S1 interface) and between the pico base station 5-2 and the user communication device 3 via the air interface (which is different than the one used for the control plane).

The macro base station 5-1 and the pico base station 5-2 can communicate with each other via the X2 interface, for example, to exchange base station specific configurations and/or control data.

An S5/S8 interface is provided between the MME 12 and the Serving Gateway, SGW, 14 in order to manage the routing of user plane data through the core network 7.

A description will now be given of a possible solution for handling an interference situation using the above architecture.

IDC Interference Handling

When the user communication device 3 initially communicates with the MeNB 5-1, both the control plane and the user plane connections are made with the macro base station 5-1. At this time, the MeNB 5-1 may send the user communications device 3 some IDC configuration parameters that define how the user communications device 3 is able to reduce the IDC interference. One such parameter is the autonomous denial rate (as specified in 3GPP TS 36.331), which defines a maximum rate at which the user communications device 3 is allowed to block uplink transmissions to the MeNB 5-1 when trying to mitigate IDC interference. However, this denial rate is only applicable for communications with the MeNB 5-1.

If the MeNB 5-1 decides later to split the control and user planes for the user communication device 3, the MeNB 5-1 reconfigures the user communication device 3 so that the user-plane (which might be more prone to interference than the control-plane) is provided via the SeNB 5-2. Initially, the user communication device 3 may not have any information on the SeNB's 5-2 capability to support TDM solutions for handling IDC situations (e.g. the autonomous denial operation already configured for the user communication device 3) and/or to support a different TDM solution than that supported by the MeNB 5-1 (e.g. a different autonomous denial operation or a DRX configuration). Thus, when the C/U Split is initially configured, the user communication device 3 does not apply any autonomous denial rate operation to its communications with the SeNB 5-2.

As mentioned above, the base stations 5 can exchange information with each other relating to the operation of the base stations 5 and/or the user communication device 3 in order to handle any such arising IDC interference. Thus, in this case, the SeNB 5-2 can provide its own IDC configuration (e.g. its applicable autonomous denial rate) to the MeNB 5-1 by sending an appropriately formatted RRC message within an X2 RRC container. The RRC message includes the SeNB's 5-2 IDC configuration. In this example, the MeNB 5-1 forwards the SeNB's RRC message (and hence the IDC configuration included in the RRC message) to the user communication device 3; and the user communication device 3 will therefore have two different sets of IDC configuration data that control the user device's response to detected interference situations with respect to the communication links it has with the MeNB 5-1 and the SeNB 5-2.

Thus, beneficially, the user communication device 3 is able to apply different IDC configurations for its communications with the MeNB 5-1 (i.e. control-plane communications) and with the SeNB 5-2 (i.e. user-plane communications after the C/U Split). If the user communication device 3 does not have an IDC configuration from the SeNB 5-2, then as soon as the user communication device 3 detects IDC interference on the user plane, it would have to seek assistance from the SeNB 5-2 as to what it should do. However, since the user communication device 3 has an IDC configuration from the SeNB 5-2, the user communications device 3 can use it to try to solve any IDC interference problem with its communications with the SeNB 5-2 before having to request assistance from the SeNB 5-2. Thus it is possible to avoid unnecessary signalling (e.g. request for the network's assistance) resulting from the user communication device 3 applying an incorrect IDC configuration (or not applying any IDC configuration) to its communications with the SeNB 5-2.

One benefit associated with the autonomous denial rate operation is that it is possible to keep the base station transmission power at an optimum level, even when IDC interference is detected. Otherwise, the user communications device 3 would have to transmit its scheduled data at an increased power (i.e. to compensate for the interference). Further, if the user communications device 3 is not configured to perform autonomous denial in case of IDC interference, the serving base station 5 might assume link problems between them and therefore increase the transmission power on its physical downlink control channel (PDCCH).

Further, autonomous denial is beneficial as it provides a way for the user communication device to maintain connectivity to allow for sending critical RRC messages by denying ISM transmissions and/or sending critical ISM messages by denying LTE transmissions.

Moreover, because independent IDC configurations are provided for the MeNB 5-1 and for the SeNB 5-2, it is possible to apply different IDC configurations for communications with the MeNB 5-1 than for communications with the SeNB 5-2, the signals of which may have different tolerance for IDC interference (e.g. a small cell might be more prone to interference than a macro cell).

Advantageously, the user communication device 3 can also communicate control signalling (e.g. a request for assistance for handling an IDC situation) with the SeNB 5-2 via the MeNB 5-1. In particular, the user communication device 3 can transmit an appropriately formatted message (e.g. an RRC message) to the MeNB 5-1, which forwards the message or its content to the SeNB 5-2 via the X2 interface that connects the two base stations (e.g. using an X2 RRC container). Similarly, the SeNB 5-2 can send control signalling (e.g. a response message and/or a request) to the user communication device 3, by transmitting an appropriately formatted message (e.g. an RRC message) to the MeNB 5-1 (in an X2 RRC container), and the MeNB 5-1 then forwards the message to the user communication device 3.

Thus, the base stations 5 exchange such information and control signalling over the X2 interface provided between them, using appropriately formatted RRC containers. Using such X2 RRC containers, it is possible therefore to provide an appropriate RRC connection between the user communication device 3 and the SeNB 5-2 (via the MeNB 5-1) even though the user communication device 3 does not have control-plane connectivity with the SeNB 5-2.

Operation—in-device Coexistence

Figure 6:
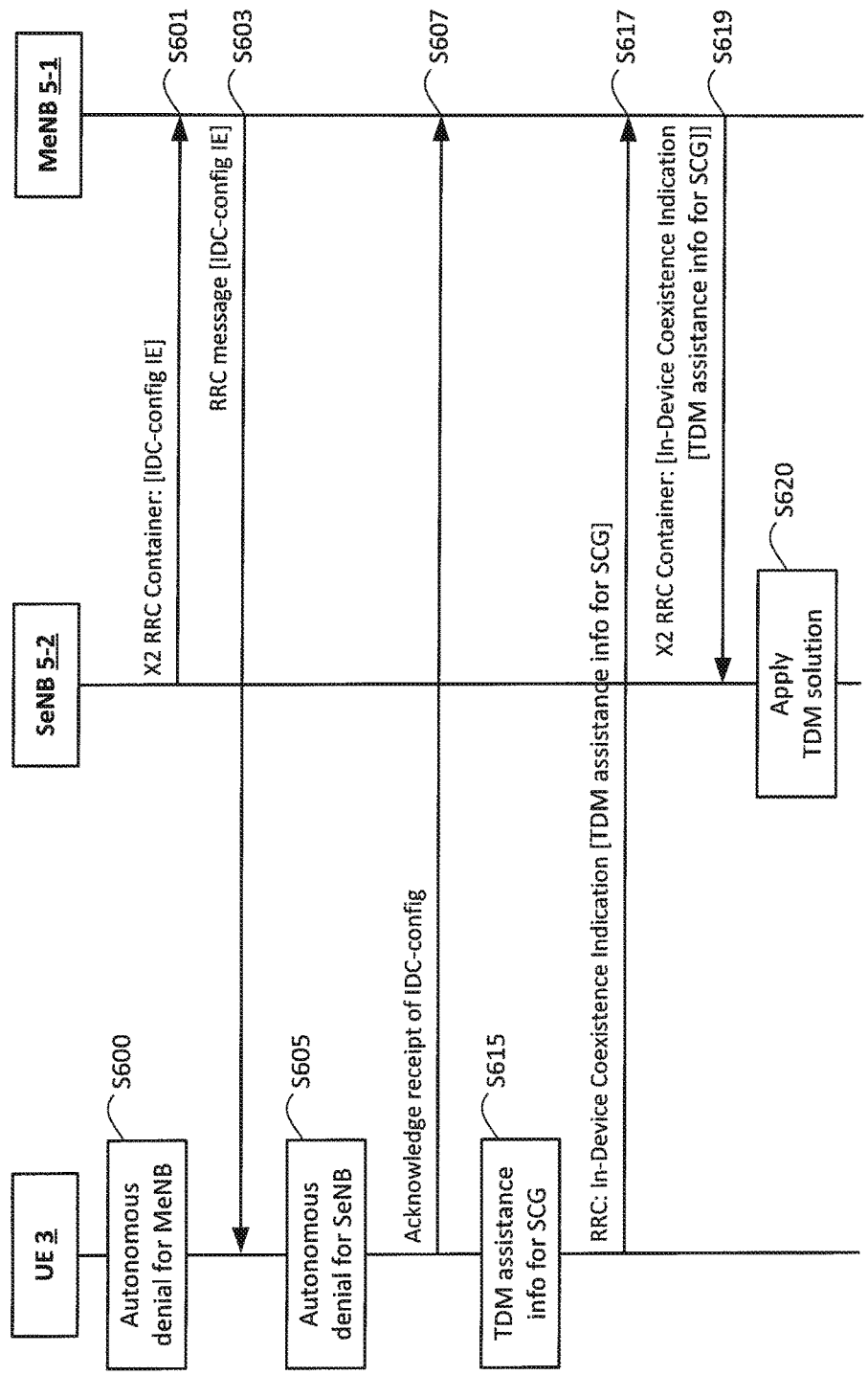
FIG. 6 is an exemplary timing diagram illustrating an in-device coexistence procedure performed by the nodes forming part of the mobile telecommunication system shown in FIG. 1.

A more detailed description will now be given (with reference to FIG. 6) of the messages sent between the user communications device 3, the MeNB 5-1 and the SeNB 5-2 in this embodiment. In particular, FIG. 6 is an exemplary timing diagram illustrating an in-device coexistence procedure performed by the user communications device 3, the MeNB 5-1 and the SeNB 5-2.

In this example, as generally shown at step S600, the user communication device 3 is initially configured to apply autonomous denial parameters for the cell(s) of the MeNB 5-1 (i.e. the cell(s) 6A/6B that are included in the MCG for this user communication device 3). Such autonomous denial parameters might comprise default parameters and/or specific parameters provided by the MeNB 5-1. However, since the user-plane for the user communication device 3 is routed via the SeNB 5-2, at this phase, the user communication device 3 is not able to handle, on its own, IDC situations arising in the cell(s) 6C-6D carrying its user-plane traffic.

According to the applicable standards, a single autonomous denial parameter (i.e. a single IDC configuration) is provided by the network to the user communication device 3, even if the frequencies used in the cells of both the MeNB 5-1 and the SeNB 5-2 are expected to have IDC problems. For example, the network can specify "2 subframes per 200 subframes" as the autonomous denial parameter for both the MeNB 5-1 and the SeNB 5-2. In other words, the network authorises the user communication device 3 to deny up to 2 out of every 200 subframes scheduled for that UE in the event that IDC interference is detected, regardless whether the interference is detected in a cell of the MeNB 5-1 or a cell of the SeNB 5-2.

However, in this example, it is beneficially possible to configure separate autonomous denial parameters for the MeNB 5-1 and the SeNB 5-2 and to notify the user communication device 3 about the parameters applied by the SeNB 5-2. For example, the SeNB 5-2 may support a low (e.g. a minimum) autonomous denial parameter value and the MeNB 5-1 may support a higher value (or vice versa).

Therefore, as shown in step S601, the SeNB 5-2 generates (using its X2 RRC container module 520) and sends an appropriately formatted signalling message (e.g. an X2 RRC container) to the MeNB 5-1, and includes in this message the IDC configuration parameters for the user communication device 3. In this example, the SeNB 5-2 includes an "IDC-config" information element (IE) in a suitable RRC message within the X2 signalling (container) sent to the MeNB 5-1. Effectively, the presence of the IDC configuration in the RRC Container over X2 implicitly informs the MeNB that the SeNB 5-2 supports the IDC feature. Thus, beneficially, there is no need for the MeNB 5-1 and SeNB 5-2 to exchange such information using a separate message.

In this embodiment, the SeNB's 5-2 RRC message is associated with an appropriate message identifier (e.g. a "transaction identifier" IE) so that when the user communication device 3 responds to this message, the MeNB 5-1 can forward the response to the SeNB 5-2 (rather than processing it itself as with normal RRC messages generated by the MeNB itself). It will be appreciated that the MeNB 5-1 may track every message based on their associated transaction identifiers and ensure that no more than a predetermined number of messages are executed in parallel. Alternatively or in addition, the RRC message may also comprise information identifying the base station (SeNB/MeNB) originating the RRC request (or terminating a corresponding RRC response) so that the MeNB 5-1 can forward any SeNB specific RRC responses to the SeNB 5-2 (regardless whether or not a transaction identifier is present) and processes only the MeNB specific RRC responses.

In response to receiving the RRC message from the SeNB 5-2, the MeNB 5-1 sends, in step S603, the RRC message generated by the SeNB 5-2 (or a different message containing or corresponding to the SeNB's 5-2 message) to the user communication device 3. This message includes the "IDC-config" IE specifying the autonomous denial parameters applied by the SeNB 5-2. Preferably, the MeNB 5-1 sends the same parameters to the user communication device 3 that were received from the SeNB 5-2, although it will be appreciated that, in some cases, it may be beneficial/necessary for the MeNB 5-1 to override the configuration provided by the SeNB's 5-2. It will be appreciated that before the MeNB 5-1 forwards the SeNB's 5-2 message to the user communication device 3, it ciphers the message using the dedicated ciphering keys used for communications between the MeNB 5-1 and the user communication device 3.

Thus, as generally shown in step S605, the user communication device 3 is now able to apply the correct parameters for its communications with the SeNB 5-2 in case of IDC interference and hence the user communication device 3 does not need to seek assistance from the network, unless it is unable to address the IDC interference on its own (e.g. based on the received parameters).

In step S607, the user communication device 3 generates and sends an appropriately formatted confirmation message to the MeNB 5-1, to confirm that the configuration for the SeNB 5-2 has been received successfully.

It is noted that the user communication device 3 continues to apply the parameters for the MeNB 5-1 for its control-plane communications, as discussed above with reference to step S600.

Steps S615 to S620 illustrate an exemplary situation when the IDC configuration provided by the SeNB 5-2 is put into use by the user communication device 3.

Specifically, in step S615, the user communication device 3 detects an interference arising from concurrent communications using the LTE and non-LTE communication technologies. First, the user communication device 3 applies the received IDC configuration parameters, and attempts to address the interference by denying some of its scheduled transmissions. However, if the interference persists even after the user communication device 3 has reached the maximum allowed number of denied transmissions, the user communication device 3 needs to inform the network about the IDC situation. In order to do so, the user communication device 3 generates assistance information (e.g. TDM assistance information) for sending to the serving base station 5 (e.g. in an appropriate RRC message, such as an 'InDeviceCoexIndication' message).

In this case, since the interference affects the user communication device's 3 user-plane communications, the user communication device 3 generates assistance information for the SCG (i.e. the cell(s) 6C/6D being currently used by the user communication device 3 for the user plane communications). In particular, the user communication device 3 may include assistance information in a suitable information element (e.g. a 'tdm-AssistanceInfo' IE) that identifies for each affected frequency/cell belonging to the SCG that is experiencing the interference information that will assist the SeNB 5-2 to re-configure its communications with the user communication device 3 to avoid the interference. In the case that the user communication device 3 detects interference to the communications with both the MeNB 5-1 and the SeNB, the user communications device 3 may provide a single list of affected frequencies for both the MeNB 5-1 and the SeNB 5-2, i.e. a common "affectedCarrierFreqList-r11" IE listing any cell 6A to 6D that is experiencing IDC interference. Although the user communication device 3 may send separate lists (one for each of the SeNB 5-2 and the MeNB 5-1) if desired. However, as the communication configuration between the user communications device 3 and the MeNB 5-1 may be very different to the communication configuration between the user communication device and the SeNB 5-2, the user communication device 3 preferably sends a separate "tdm-AssistanceInfo" IE, to each of the base stations 5-1 and 5-2—giving them different assistance information that will help the respective base station 5 address the IDC interference problem with regard to its transmissions. The assistance information may include, for example, one or more of a suggested DRX cycle length (e.g. 'drx-CycleLength' IE), DRX offset (e.g. 'drx-Offset' IE) and DRX active time (e.g. 'drx-ActiveTime' IE) that will help to avoid the interfering signal. The user communication device 3 may also provide an indication of a subframe pattern associated with the detected IDC interference, instead of (or in addition to) providing DRX assistance information. Such subframe pattern may be provided, e.g. using an appropriate 'idc-SubframePatternList' IE(s). Further details of the 'InDeviceCoexIndication' message and the associated information elements (fields) may be found in section 6.2.2 of the 3GPP TS 36.331 standard, the contents of which are incorporated herein by reference.

Next, the user communication device 3 generates (using its RRC module 314) and sends, at step S617, an appropriately formatted message (e.g. an InDeviceCoexistence' RRC message) to the MeNB 5-1, and includes in this message the assistance information for the SCG (e.g. in an appropriate information element, e.g. any (SeNB specific) "affectedCarrierFreqList-r11" IE and/or 'tdm-AssistanceInfo' IE provided by the user communication device 3). Although not shown in FIG. 6, the user communication device 3 may also include in this message any MeNB specific information elements, if appropriate.

In response, seeing that the interference affects the cells of the SeNB 5-2, the MeNB 5-1 generates (using its X2 RRC container module 520) and sends, in step S619, an appropriately formatted signalling message to the SeNB 5-2, and includes in this message the (SeNB specific) assistance information provided by the user communication device 3 (e.g. the 'InDeviceCoexIndication' RRC message and any information elements received at S617).

Based on this message, the SeNB 5-2 (using its interference management module 516) applies an appropriate solution (in this example, a TDM solution) to its (user-plane) communications with the user communication device 3. For example, the interference management module 516 may instruct the scheduler module 515 to schedule time slots (e.g. apply discontinuous transmission/reception (DTX/DRX) operation) such that the reported IDC interference can be reduced or eliminated. It is noted that in step S620 the interference management module 516 may also instruct the scheduler module 515 to apply an FDM solution (e.g. allocate different frequencies) and/or apply a Power solution (e.g. by changing/reducing the transmit power used) so that IDC interference is reduced or eliminated.

In any case, it is possible to apply an appropriate IDC configuration for the cell(s) of the SeNB 5-2 even though there is no RRC connection between the user communication device 3 and the SeNB 5-2 in the case of C/U Split. Further, it is possible for the user communication device 3 to report IDC situations arising with respect to cell(s) of the SeNB 5-2 by sending an appropriate signalling message from the user communications device 3 to the MeNB 5-1, and by the MeNB 5-1 forwarding the information relating to the IDC situation to the SeNB 5-2 (using an X2 RRC container).

Thus, beneficially, it is possible to configure IDC functionality for each base station 5-1 and 5-2 involved in the C/U Split, and to obtain assistance information from the user communication device 3 with respect to cells of each base station 5-1 and 5-2, and thereby address any IDC situation effectively and without requiring excessive signalling between the various network nodes.

It will be appreciated that the use of X2 RRC containers may be beneficial in other scenarios than handling of IDC interference. Examples of such other scenarios are described with reference to FIGS. 7 to 9 below.

Operation—Counter Check Procedure

Figure 7:
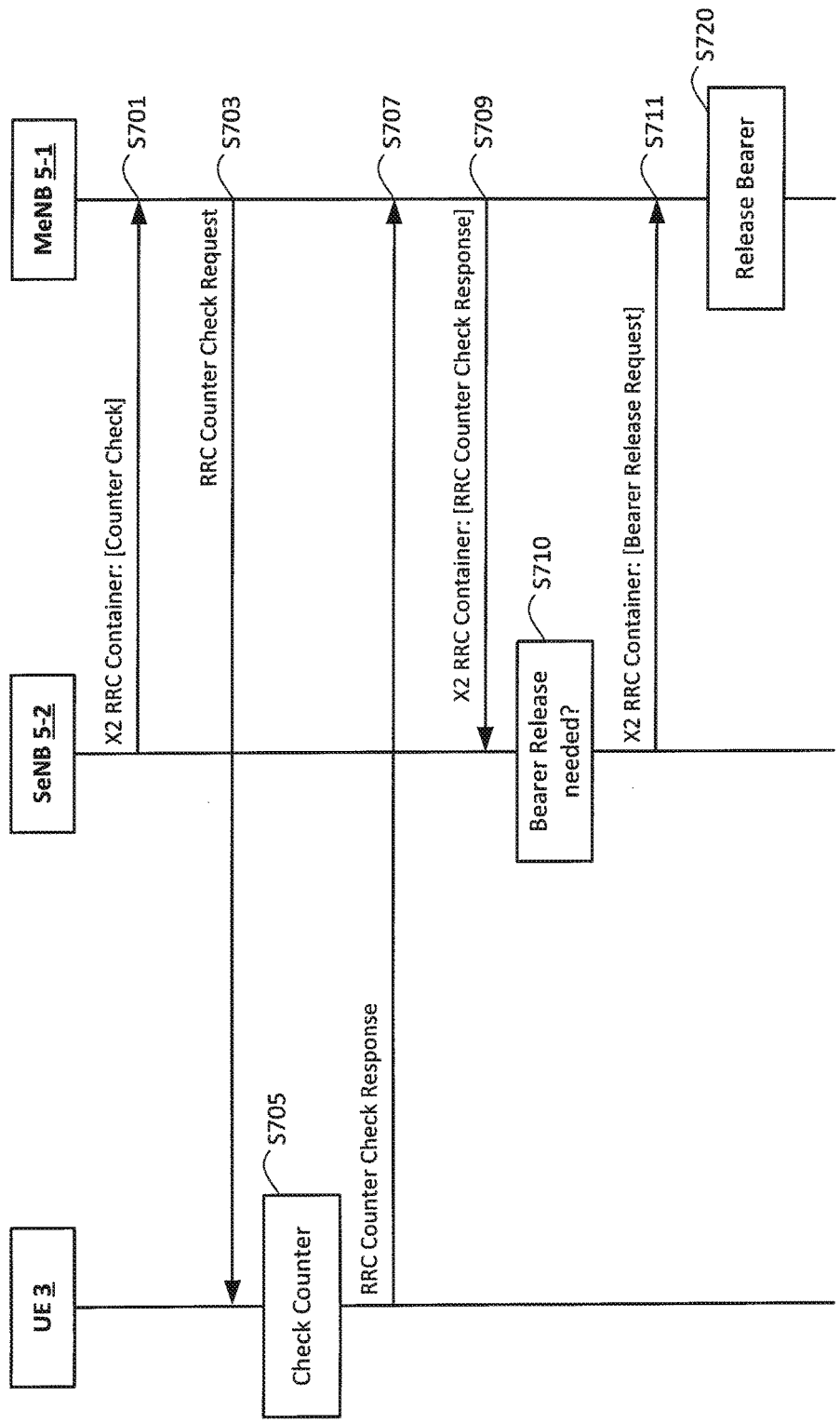
FIG. 7 is an exemplary timing diagram illustrating a counter check procedure performed by the nodes forming part of the mobile telecommunication system shown in FIG. 1.

FIG. 7 is an exemplary timing diagram illustrating a counter check procedure performed by the user communications device 3, the MeNB 5-1 and the SeNB 5-2.

Section 5.3.6.1 of 3GPP TS 36.331 describes the general counter check procedure, which may be used by the E-UTRAN to request a user communication device to verify the amount of data sent/received on each data radio bearer (DRB) allocated to that user communication device. Specifically, the user communication device is requested (by its serving base station) to check if, for each DRB, the most significant bits of the 'COUNT' parameter matches the value(s) indicated by the E-UTRAN as the value(s) corresponding to the amount of data received/sent by the network. In response to the request, the user communication device sends to its serving base station an indication whether there is a 'match' or 'no match'.

Effectively, the counter check procedure enables the E-UTRAN to detect packet insertion by an intruder (a 'man in the middle') on the uplink/downlink resources allocated to the user communication device. In case there is no match between the values provided by the network and the values maintained by the user communication device, which might be indicative of a potential security break, the network initiates corrective actions, e.g. releases the affected DRB(s).

This counter check procedure may be required for the DRB(s) terminated in the SeNB 5-2. However, the current standards do not allow for this since there is no direct control-plane (RRC) connection between the user communication device 3 and the SeNB 5-2. In this embodiment, therefore, the SeNB is configured to initiate the counter check procedure for the user communication device 3 it is serving, by generating (using its X2 RRC module 520) and sending, at step S701, an appropriately formatted signalling message to the MeNB 5-1. Specifically, the SeNB 5-2 includes in the X2 message it sends to the MeNB 5-1 a 'Counter Check' RRC message, requesting the counter check procedure to be performed with the user communication device 3. The SeNB 5-2 also includes in its request the values (e.g. the most significant bits of an associated counter) corresponding to the amount of data sent/received for that user communication device 3 via the SeNB 5-2.

In response to this message, the MeNB 5-1 sends, in step S703, the RRC Counter Check message generated by the SeNB 5-2 (or a different message corresponding to the SeNB's 5-2 message) to the user communication device 3. This message includes the counter values (i.e. the most significant bits thereof) provided by the SeNB 5-2 so that the user communication device 3 can carry out the requested check. As before, before the MeNB 5-1 forwards the SeNB's 5-2 message to the user communication device 3, it ciphers the message using the dedicated ciphering keys used for communications between the MeNB 5-1 and the user communication device 3.

As generally shown in step S705, the user communication device 3 performs (using its LTE module 313) the requested counter check for the DRB(s) of the SeNB 5-2, based on the request received from the MeNB 5-1.

The user communication device 3 then generates (using its RRC module 314) and sends, in step S707, an appropriately formatted counter check response message to the MeNB 5-1, to inform the network about the result of the counter check. In step S709, the MeNB 5-1 forwards the user communication device's 3 response (or a message corresponding to it) to the SeNB 5-1, using an appropriately formatted X2 RRC container (which includes the results of the counter check).

Upon receipt of the user communication device's 3 response, the SeNB 5-2 proceeds to determine whether or not a security breach (e.g. a 'man in the middle' attack) has occurred concerning the user communication device 3. Specifically, if the response from the user communication device 3 indicates that the counter value provided by the SeNB 5-2 matches the amount of data that has been sent/received by the user communication device 3, the SeNB 5-2 terminates the current counter check procedure (i.e. the occurrence of packet insertion has not been determined). In this case, therefore, the bearer for which a counter-check has been performed does not need to be released and the user communication device 3 can continue using that bearer (at least until a subsequent counter check procedure and/or handover).

However, if the response from the user communication device 3 indicates that the counter value provided by the SeNB 5-2 does not match the amount of data that has been sent/received by the user communication device 3, the SeNB 5-2 determines that (possibly fraudulent) packet insertion has occurred (e.g. by a different communication device) on behalf of the user communication device 3 using the communication resources (DRBs) allocated to the user communication device 3. Accordingly, if such packet insertion has been determined, the SeNB 5-2 generates (using its X2 RRC container module 520) and sends, at step S711, an appropriately formatted signalling message to the MeNB 5-1, requesting the MeNB 5-1 to release the affected bearer(s) and/or to allocate different bearers instead.

Finally, in step S720, the MeNB 5-1 complies with the SeNB's 5-2 request and releases the affected bearer(s) indicated by the bearer release request from the SeNB 5-2. At this step, or in a subsequent one, the MeNB 5-1 may allocate a different bearer (or re-allocate the same bearer with updated security parameters) to the user communication device 3 so that service continuity for the UE 3 is ensured.

Steps S701 to S720 may be repeated (e.g. periodically and/or upon an associated counter reaching a predetermined value) whenever the SeNB 5-2 needs to perform a counter check procedure with the user communication device 3.

Advantageously, whilst the C/U Split is in place, it is possible to verify that the respective counters maintained by the user communication device 3 and the SeNB 5-2 match, and/or to trigger release of a bearer for which the user communication device 3 returns an invalid Counter Check Response (i.e. indicates 'no match').

Operation—UE Information Reporting for SON

Figure 8:
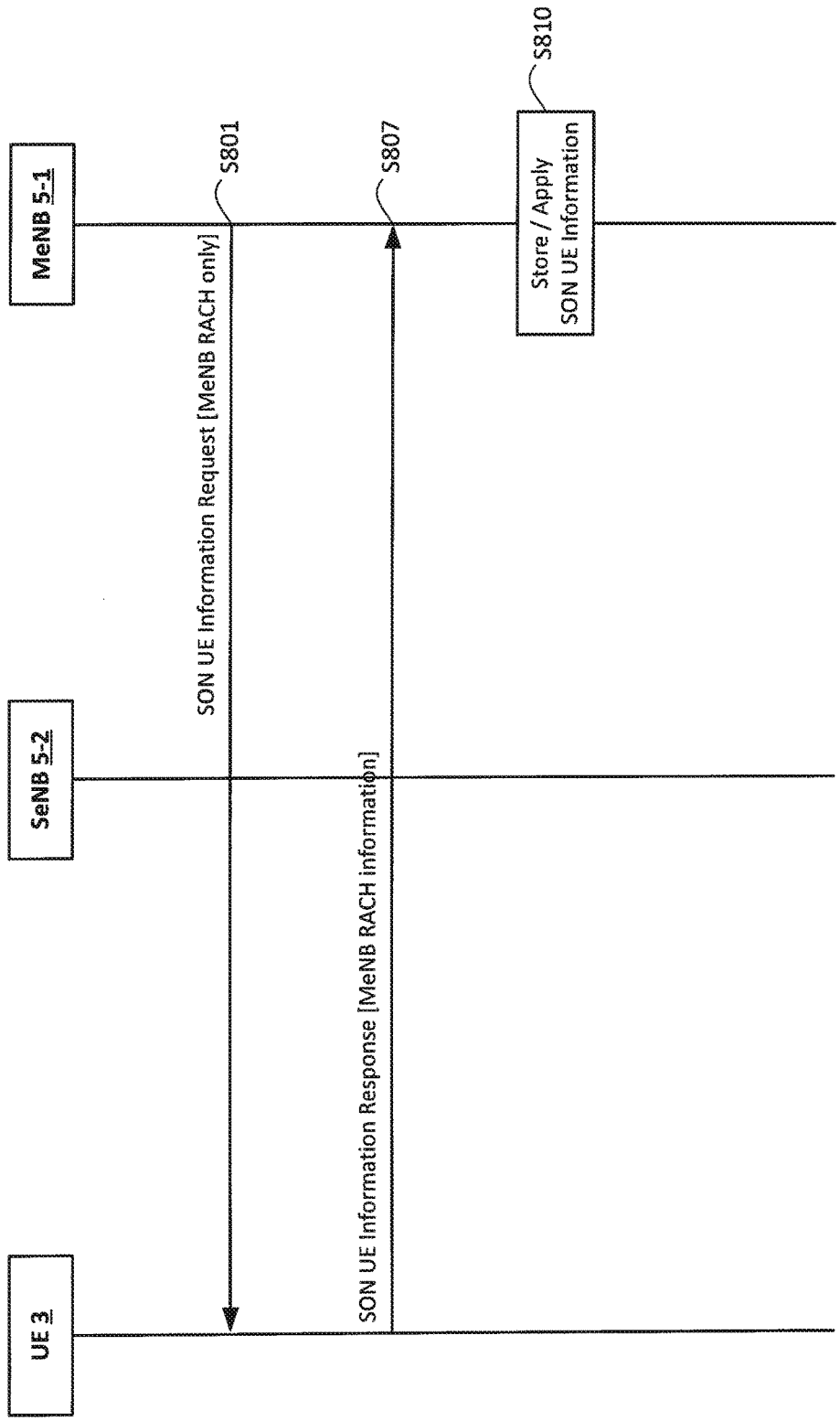
FIG. 8 is an exemplary timing diagram illustrating an information request procedure performed by the nodes forming part of the mobile telecommunication system shown in FIG. 1.

FIG. 8 is an exemplary timing diagram illustrating an information request procedure performed by the user communications device 3, the MeNB 5-1 and the SeNB 5-2.

A so-called Self-Organising Network (SON) employs a communication technology that facilitates dynamic configuration (and/or reconfiguration) of communications between network elements, e.g. base stations and/or user communication devices. Such a SON technology may be used e.g. for optimising/updating a radio access network infrastructure without requiring assistance from the network operator (e.g. substantially automatically). In order to facilitate SON functionality, the base stations 5 and user communication devices 3 may also exchange other information than measurement results, e.g. information relating to the SON capability of a particular item of user equipment and/or base station.

Conventionally, if a base station 5 requests information about the SON capabilities of a user communication device 3, then the user communication device 3 would report statistics relating to all cells currently serving the user communication device 3. In this embodiment, however, in the event that the SeNB 5-2 does not initiate the request for SON information and the MeNB 5-1 does request SON information from the user communication device 3, then the user communication device 3 is configured to only report information relating to the serving cells of the the MeNB 5-1. In this case, the MeNB 5-1 will specify that the RACH request is only related to the MeNB 5-1.

This operation is illustrated in FIG. 8. Specifically, as shown in step S801, the MeNB 5-1 generates and sends an appropriately formatted message to the user communication device 3 requesting information from the user communication device 3 in order to be able to configure a SON (comprising the base stations 5-1, 5-2, and the user communication device 3). In this case, the message sent by the MeNB 5-1 comprises a 'SON UE information request' RRC message, and specifies that the user communication device 3 is to provide SON information in relation to cells 6A and/or 6B of the MeNB 5-1. The request message does not specify any of the cells 6C and 6D of the SeNB 5-2.

In response to receiving this message, the user communication device 3 generates (using its SON module 323) and sends, in step S807, an appropriately formatted response to the MeNB's 5-1 information request, informing the MeNB 5-1 about UE specific information relating to SON functionality for the specified cells only. Typically, the SON information includes the Random Access Channel (RACH) statistics specific to the specified cells (in this case cells 6A and/or 6B of the MeNB 5-1). For example, the response by the user communication device 3 may specify the last successful RACH procedure with respect to the cells 6A and/or 6B. The report does not include SON information relating to other serving cells, such as cells 6C and 6D of the SeNB 5-2. To facilitate this, the user communication device 3 is configured to store RACH information on cells 6A/6B (of the MeNB 5-1) even if the last successful RACH was on one of cells (6C or 6D) of the SeNB 5-2. Conventionally, the user communication device 3 only stores information on the last successful RACH procedure, regardless of the cell.

Finally, as generally shown in step S810, the MeNB 5-1 stores (in memory 509) and applies the received user communication device specific information relating to SON functionality in (re-)configuring the self-organising network of which the MeNB 5-1 (and the SeNB 5-2) forms a part. Although not shown in FIG. 8, it will be appreciated that the MeNB 5-1 may be configured to forward the received SON information to other SON entities, e.g. a SON server, if appropriate.

Operation—Provision of Broadcast/Multicast Services

Figure 9:
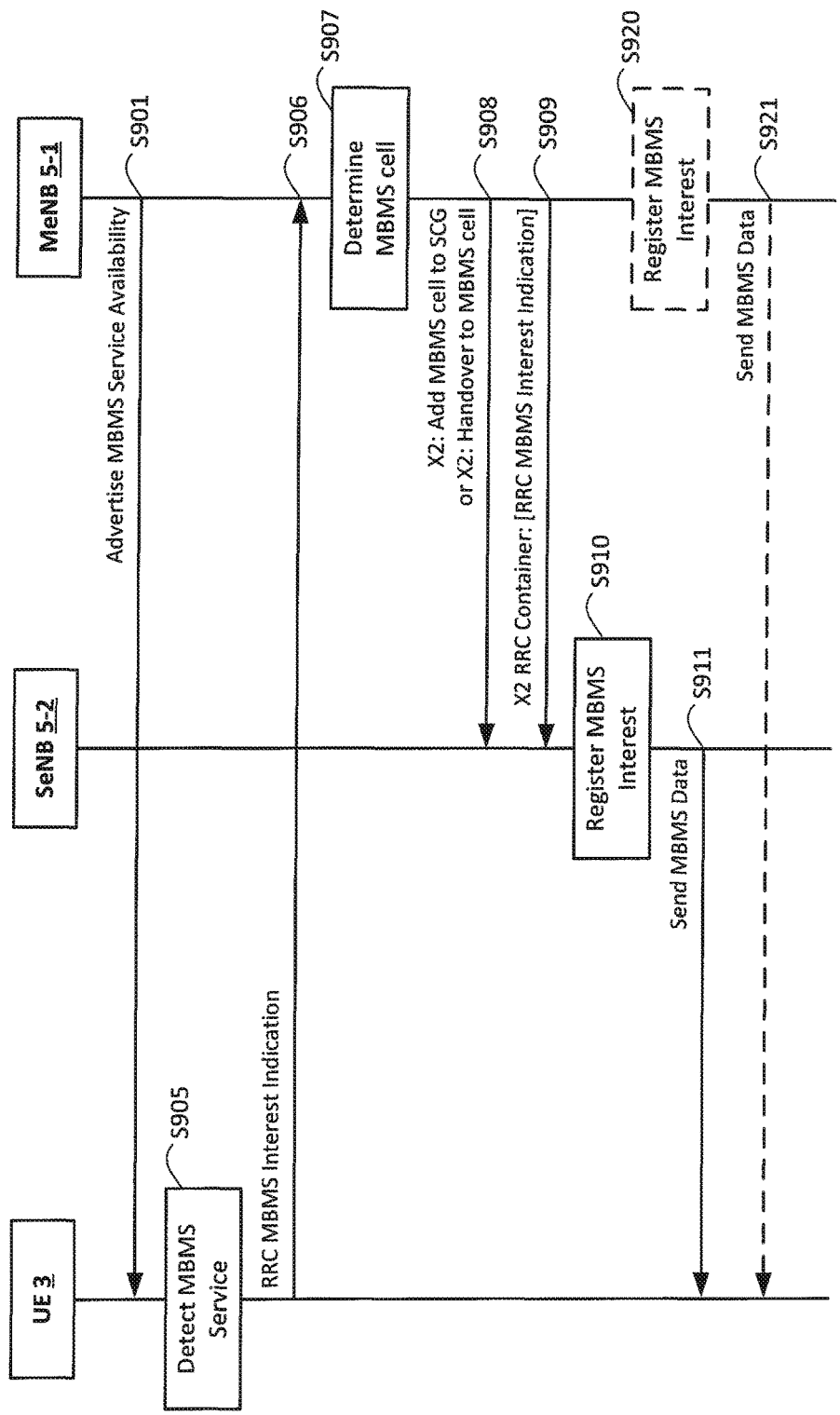
FIG. 9 is an exemplary timing diagram illustrating a broadcast/multicast service procedure performed by the nodes forming part of the mobile telecommunication system shown in FIG. 1.

FIG. 9 is an exemplary timing diagram illustrating a broadcast/multicast service procedure performed by the user communications device 3, the MeNB 5-1 and the SeNB 5-2.

The Multimedia Broadcast/Multicast Service (MBMS) refers to the coordinated transmission of data (content) for a group of subscribers via a plurality of base stations (such as the MeNB 5-1 and the SeNB 5-1), using a common bearer (e.g. an MBMS bearer). When using such a common bearer for communicating data for a plurality of users (i.e. the respective user communication devices thereof), it is possible to reduce the overall network load when compared to using a separate dedicated bearer for each subscriber (user communication device) receiving that service. However, some services are only provided via MBMS when a sufficient number of users are interested in receiving the content (otherwise the services may be provided via normal, dedicated bearers). The user communication devices may therefore be requested by the network to provide an appropriate indication (e.g. an indication of MBMS interest) on the services that they are interested in receiving via broadcast/multicast bearers. Such MBMS interest is normally provided to the serving base station in an appropriately formatted RRC message. Thus, for each MBMS-capable base station, it is possible to determine (in dependence on the number of users interested) whether or not the provision of MBMS is needed.

In case of dual connectivity, the MeNB 5-1 and the SeNB 5-2 coordinate their efforts to ensure that the user communication device 3 is able to receive MBMS service(s) and/or any non-MBMS service (e.g. unicast services) subject to any indicated interest and capabilities of the user communication device 3. Table 1 below summarises various MBMS scenarios that are possible in case of dual connectivity.

TABLE 1

MBMS and dual connectivity scenarios

| Scenario | Frequency | Cell | Expected result |
| --- | --- | --- | --- |
| #1 | Serving | Serving in MCG | UE could already receive MBMS |
| #2 | Serving | Serving in SCG | UE could already receive MBMS |
| #3 | Non-Serving | Non-serving at MeNB | MeNB may move the UE to a cell on the reported frequency, or configure the UE with a cell on the reported frequency |
| #4 | Non-Serving | Non-serving at SeNB | Add cell to SCG |
| #5 | Non-Serving | Non-serving at eNB other than MeNB and SeNB | MeNB may move the UE to a cell on the reported frequency |

Whilst some of the above scenarios may cause no problems and/or might be addressed using existing procedures (e.g. when the MBMS frequency is part of a serving cell group), the current standards do not provide a solution to provide MBMS services to the user communication device 3 in case of scenario #4.

However, in the following example, X2 RRC procedures are applied to address various scenarios (including scenario #4), in which the MBMS frequency is under the SeNB 5-2.

Initially, as generally shown in step S901, the network (e.g. the MeNB 5-1) advertises the available MBMS services (and possibly the frequencies on which such MBMS services are transmitted).

Next, in step S905, the user communication device 3 detects (e.g. using its MBMS module 325) a particular MBMS service that a user of the user communication device 3 is interested in receiving.

Therefore, the user communication device 3 generates (using its MBMS module 325) and sends, in step S906, an appropriately formatted signalling message (e.g. an 'mbmsInterestIndication' RRC message) to the MeNB 5-1, and includes in this message information identifying the MBMS service (and possibly the frequency on which the MBMS service is to be transmitted and/or information identifying the user).

The MeNB 5-1 maintains information on the frequencies supported in each cell 6A to 6D. Thus, in step S907, the MeNB 5-1 determines the cell associated with the requested MBMS service (i.e. the cell associated with the frequency of the MBMS service). If the MeNB 5-1 determines that the frequency on which the user communication device 3 wishes to receive the MBMS service is already used by the user communication device 3 (e.g. via the SeNB 5-2), the MeNB 5-1 proceeds to step S909.

However, in this example, the request by the user communication device 3 indicates a frequency which is not supported by the MeNB 5-1, but which is supported by the SeNB 5-2. However, the cell of the SeNB 5-2 that supports the indicated frequency is not included in the current SCG for the user communication device 3. In this case, either the MBMS cell is added to the SCG (if the user communication device 3 supports carrier aggregation (CA)—in which the user communication device can communicate on different carrier frequencies at the same time) or if the user communication device 3 does not support carrier aggregation—and so cannot communicate on different carrier frequencies of the SeNB 5-2, then the currently serving cell of the SeNB 5-2 must be changed to the MBMS cell. Thus when the user communication device 3 reports a frequency that is not included in the SCG, the MeNB 5-1 verifies whether or not the user communication device 3 supports carrier aggregation (CA). If the user communication device 3 supports CA, then the MeNB 5-1 requests (at S908) the SeNB 5-2 to add the MBMS cell frequency as an additional component carrier. If however, the user communication device 3 does not support CA, then the MeNB 5-1 requests (at S908) the SeNB 5-2 to handover the user communication device 3 from its current cell to the MBMS cell (i.e. to replace the existing serving cell of the SeNB 5-2 with the MBMS cell).

In step S909, the MeNB 5-1 transmits the user communication device's 3 indication of interest (or a message corresponding to it) to the SeNB 5-1, using an appropriately formatted X2 RRC container.

Therefore, as generally shown in step S910, the SeNB 5-2 can register (in memory 509) the user's interest in that particular service (on that particular frequency). Finally, in step S911, the SeNB 5-2 begins to transmit (using its MBMS module 519) the requested service on the appropriate frequency allocated for the service. In the case where the user communication device does not support CA, the SeNB 5-2 will transmit both the MBMS service and the original user plane (unicast) data to the user communication device 3 using the MBMS cell/frequency.

Of course, as generally shown in steps S920, the MeNB 5-1 may also register the user's interest in the MBMS service, and it may also transmit (in step S921) the same MBMS service (e.g. on a different frequency) for example to other users that are also interested the same service. This beneficially allows the user communication device 3 to receive the service via the MeNB 5-1 as well, if appropriate, e.g. if the MBMS service cannot be provided with an acceptable quality via the SeNB 5-2. Further, the MeNB's 5-1 transmissions may serve as a back-up frequency in case the C/U Split needs to be terminated or reconfigured (in which case the user-plane and/or any MBMS service might be provided via the MeNB 5-1).

Operation—Measurement Configuration and Reporting

Figure 10:
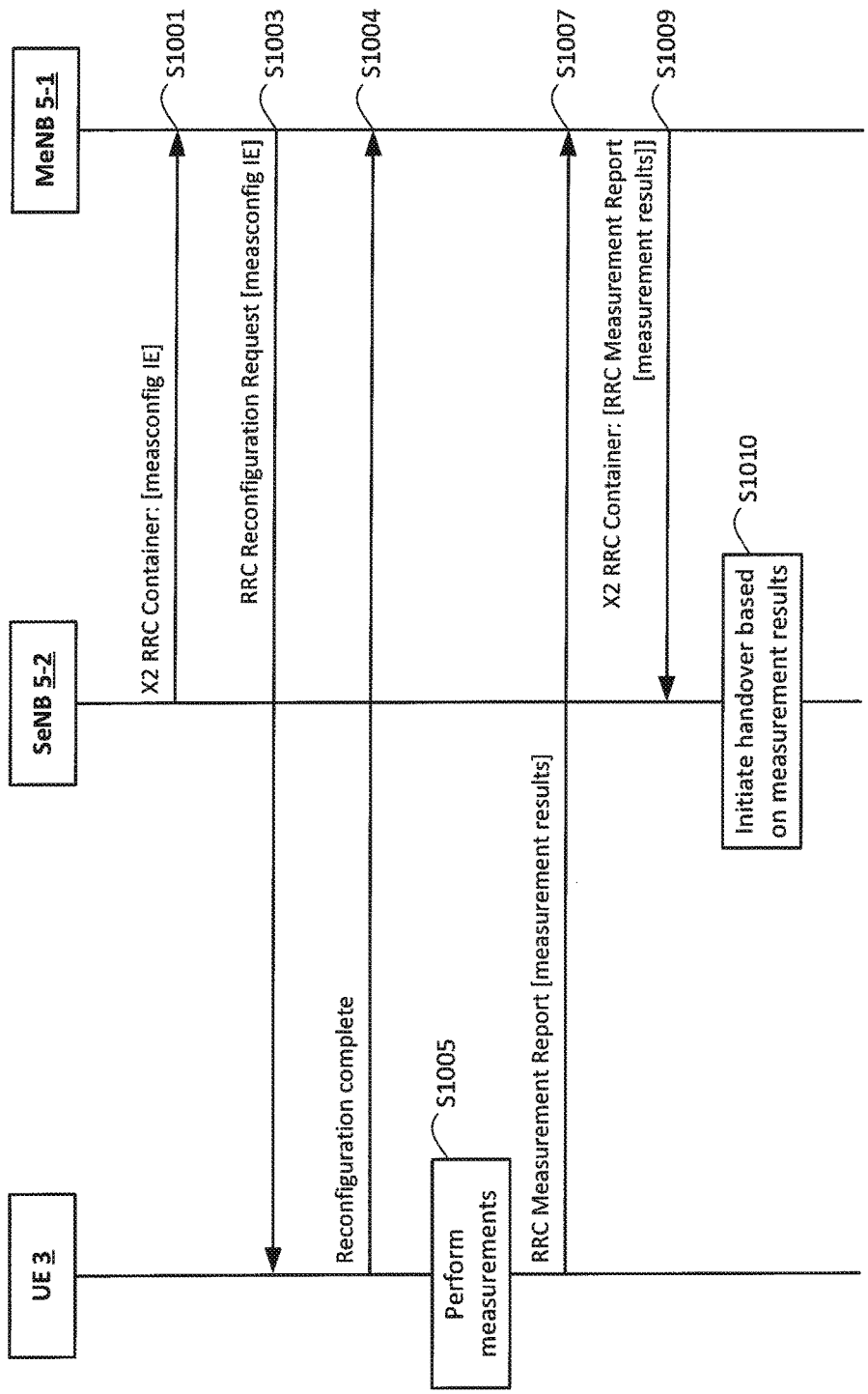
FIG. 10 is an exemplary timing diagram illustrating a measurement configuration and reporting procedure performed by the nodes forming part of the mobile telecommunication system shown in FIG. 1.

FIG. 10 is an exemplary timing diagram illustrating a measurement configuration and reporting procedure performed by the user communications device 3, the MeNB 5-1 and the SeNB 5-2.

The user communications device 3 is configured with measurement configuration data that defines different measurements that the user communication device 3 is to make on different signals it receives, such as received signal strength, interference level, and the like over different frequencies, as requested by the network, and to report the results of such measurements to the network. In dual connectivity mode, the MeNB 5-2 is arranged to provide the measurement configuration (i.e. a 'measconfig' information element specified in 3GPP TS 36.331) to the user communications device 3.

In this example, however, the SeNB 5-2 (using its measurement configuration module 514) also provides measurement configuration data for the user communications device 3, by generating and sending, at S1001, an appropriate X2 RRC container to the MeNB 5-1. The X2 RRC container includes measurement configuration data (e.g. a 'measconfig' IE) for the user communications device 3 identifying the measurements that the SeNB 5-2 wishes the user communication device 3 to perform.

In response to receiving this message, the MeNB 5-1 sends, in step S1003, an RRC Reconfiguration Request message to the user communication device 3. This RRC reconfiguration message may also include measurement configuration data generated by the MeNB 5-1 and identifying the measurements that the MeNB 5-1 wishes the user communication device 3 to perform. Similarly, the MeNB 5-1 may also generate an RRC reconfiguration message identifying the measurements that the MeNB 5-1 wishes the user communication device 3 to perform when there is no measurement configuration data from the SeNB 5-2.

In step S1004, the user communication device 3 confirms successful receipt of the received measurement configuration (if the user communication device 3 is able to comply with the requested measurements), and proceeds to step S1005.

However, if the user communications device 3 is unable to comply with the requested measurements (e.g. if the user communications device 3 can only comply with a part of the measurement configuration, for example, measurements for the SeNB 5-2 only) and/or it is unable to comply with any other configuration that may also be included in the RRC Reconfiguration Request (such as physical layer configuration, RLC layer configuration, MAC layer configuration etc), then the user communications device 3 is not allowed to maintain its connection with the network. Consequently, if an RRC Reconfiguration Request is not confirmed (e.g. within a predefined period of time) the RRC connection for the user communications device 3 is terminated (not shown in FIG. 10) by the MeNB 5-1. Of course, in this case the user communication device 3 can perform an RRC re-establishment procedure with the network if it needs to continue communicating via one of the base stations 5.

As generally shown in step S1005, assuming that the user communication device has confirmed the reconfiguration, the user communication device 3 configures itself to perform the requested signal measurements (using its signal measurement module 327). Once the measurements are completed, the user communication device 3 proceeds to generate (using its reporting module 321) and send, at step S1007, an appropriately formatted RRC message (e.g. an RRC Measurement Report message), and includes in this message the results of the requested measurements (provided by the signal measurement module 327).

In response to receiving this message, the MeNB 5-1 sends, in step S1009, the user communication device's 3 RRC Reconfiguration Response message to the SeNB 5-2, which can use the results of the measurements to initiate a handover, at step S1010, for the user communication device 3 (e.g. if the measurements indicate a better candidate cell for the user communication device 3 than the cell 6C/6D of the SeNB 5-2 currently serving the user communication device 3). Alternatively, in step S1009, the MeNB 5-1 may extract only the measurement results relating to the SeNB 5-2 from the received RRC Reconfiguration Response message and forward these to the SeNB 5-2 in an appropriate RRC container over the X2 interface.

Modifications and Alternatives

A number of detailed embodiments have been described above. As those skilled in the art will appreciate, a number of modifications and alternatives can be made to the above embodiments whilst still benefiting from the inventions embodied therein.

In the above embodiments, a mobile telephone based telecommunications system was described. As those skilled in the art will appreciate, the techniques described in the present application can be employed in other communications systems. Other communications nodes or devices (both mobile and stationary) may include user devices such as, for example, personal digital assistants, smartphones, laptop computers, web browsers, etc.

In the above embodiments, the user plane is provided via the SeNB only. However, it will be appreciated that in some scenarios, (part of) the user plane may also be provided via the MeNB as well. For example, a voice over IP (VoIP) service may be provided via the MeNB and other user plane services (such as web browsing) may be provided via the SeNB.

It will be appreciated that pico cell related parameters, such as its ability to support a TDM solution, autonomous denial etc, may be provided by the MME to the macro base station. In this case, step S601 of FIG. 6 may be omitted, and the MeNB may generate the RRC message sent at step S603, based on parameters provided by the MME.

In the above description of FIG. 6, the MeNB provides autonomous denial parameters for the SeNB in step S603 and the user communication device 3 continues to apply any existing (possibly different) autonomous denial parameters for the MeNB. However, it will be appreciated that the MeNB may send, in step S603, one set of autonomous denial parameters and the user communication device 3 may apply these parameters to both the MeNB and the SeNB. Thus, by sending a (new) autonomous denial parameter whilst C/U Split is in place, the MeNB may implicitly inform the user communication device 3 that the SeNB also supports this IDC feature.

In this case, in the absence of any (new) autonomous denial parameter from the MeNB whilst C/U Split is in place, the user communication device 3 can continue to apply (i.e. restrict) the current autonomous denial parameters to the MeNB (MCG) only.

In the above description of FIG. 7, the pico base station is described to send a counter-check request to the user communication device, and to receive the counter-check response via the macro base station so that the pico base station can determine whether or not to release the bearer for the user communication device. However, it will be appreciated that the pico base station may provide, e.g. in step S701 or in a separate step, the PDCP count for the pico base station cell(s), with respect of which the counter-check procedure was requested. Thus, if the macro base station receives the PDCP count for the pico cells (e.g. in a suitable X2 RRC container) from the pico base station, and the corresponding counter-check response from the user communication device, the macro base station may also be able to perform step S710 (instead of the pico base station). In this case, steps S709 and S711 may be omitted.

Further, it will be appreciated that step S908 may be omitted (or steps S908 and S909 may be combined). In this case, the MeNB may use the MBMS Interest Indication at S909 to request (e.g. implicitly) the SeNB to add the MBMS cell to the SCG or to handover the user communication device to the MBMS cell, as appropriate.

In the above embodiments, a number of software modules were described. As those skilled will appreciate, the software modules may be provided in compiled or un-compiled form and may be supplied to the base station or to the user communication device as a signal over a computer network, or on a recording medium. Further, the functionality performed by part or all of this software may be performed using one or more dedicated hardware circuits. However, the use of software modules is preferred as it facilitates the updating of base stations 5 and the user communication device 3 in order to update their functionalities.

In the above examples, the Radio Access Technologies employed by the base stations 5 operate according to either Frequency Division Duplexing (FDD) mode or Time Division Duplexing (TDD) mode. However, it will be appreciated that the base stations 5 might also operate according to any other suitable technique.

In the above description of FIG. 6, the concurrent LTE and non-LTE communications are carried out by the same user communication device. However, whilst the above embodiments have particular benefit for alleviating in device coexistence interference issues, it will be appreciated that some aspects of the invention may be employed to alleviate interference in situations where one user communication device communicates using the LTE RAT and another but separate device in the vicinity communicates using a non-LTE radio technology.

In the above embodiments, the user communication device 3 comprises separate LTE, GNSS, and ISM baseband circuits 300a to 300c. Each baseband circuit 300a to 300c is coupled to its own radio frequency transceiver 301a to 301c and uses its dedicated antenna 303a to 303c. It will be appreciated that some or all of the baseband circuits 300a to 300c, some or all of the transceivers 301a to 301c, and some or all of the antennas 303a to 303c might be combined in one component. Alternatively, the user communication device 3 might employ separate circuits and/or separate transceivers and/or separate antennas for each type of RAT that it supports. For example, although both Bluetooth and Wi-Fi are ISM radio access technologies, some user communication devices implement these standards using separate circuits and/or separate transceivers and/or separate antennas.

It is also possible that a given RAT requires more than one antenna or uses a separate transmitter and/or receiver part. It is also possible that in addition to the LTE functionality, some user communication devices implement GNSS functionality only, whilst other user communication devices might implement ISM functionality only.

The embodiments have been described using ISM transceivers as an example of non-LTE radio technologies. However, the mechanisms described herein can be applied to other non-LTE radio technologies (e.g. GNSS).

List of ISM Technologies:
Bluetooth devices;
Cordless phones;
Near field communication (NFC) devices;
Wireless computer networks, such as HIPERLAN, Wi-Fi (IEEE 802.11);
Wireless technologies based on IEEE 802.15.4, such as ZigBee, ISA100.11a, WirelessHART, and MiWi.

List of GNSS Technologies:
Global or regional satellite navigation systems, such as GPS, GLONASS, Galileo, Compass, Beidou, DORIS, IRNSS, and QZSS;
Global or regional Satellite Based Augmentation Systems, such as Omnistar, StarFire, WAAS, EGNOS, MSAS, and GAGAN;
Ground based augmentation systems, such as GRAS, DGPS, CORS, and GPS reference stations operating Real Time Kinematic (RTK) corrections.

At the discussion of steps S617 and S619, the IDC indication (TDM assistance) was embedded in an "InDeviceCoexIndication" RRC signalling message. Alternatively, the IDC indication might be sent using a different signalling message.

Although not shown in FIG. 5, in some cases the user plane connection may be routed between the pico base station 5-2 and the core network 7 (e.g. SGW 12) via the macro base station 5-1, i.e. using the X2 interface provided between them. However, in this case a so-called 'ideal backhaul' connection might be required between the macro base station 5-1 and the pico base station 5-2 in order to ensure smooth operation (i.e. very high throughput and very low latency). The specifications of an 'ideal backhaul' can be found in section 6.1.3 of 3GPP TS 36.932 (v.12.1.0), the contents of which are incorporated herein by reference.

Glossary of 3GPP Terms
BT Bluetooth
DRB Data Radio Bearer
DRX Discontinuous Reception
eNB Evolved NodeB—base station
E-UTRA Evolved UMTS Terrestrial Radio Access
E-UTRAN Evolved UMTS Terrestrial Radio Access Network
FDM Frequency Division Multiplexing
GNSS Global Navigation Satellite System
GPS Global Positioning System
IDC interference avoidance for In Device Coexistence
ISM Industrial, Scientific and Medical (radio bands)
LTE Long Term Evolution (of UTRAN)
PCG Primary Cell Group
RAT Radio Access Technology
RRC Radio Resource Control
RRM Radio Resource Management
Rx Receiver
SCG Secondary Cell Group
TDM Time Division Multiplexing
Tx Transmitter
UE User Equipment
DL Downlink—link from base station to user communication device
UL Uplink—link from user communication device to base station Various other modifications will be apparent to those skilled in the art and will not be described in further detail here.

(Supplementary Note 1) A user device comprising:
transceiver circuitry configured to communicate control plane data with a first base station and user plane data with a second base station using a first radio technology;
means for receiving first and second configuration data from the first base station, the first configuration data for configuring the user device to try to reduce interference arising as a result of communicating with said first base station and the coexistence of said first radio technology and another radio technology and the second configuration data for configuring the user device to try to reduce interference arising as a result of communicating with said second base station and the coexistence of said first radio technology and another radio technology;
means for detecting interference arising as a result of the coexistence of said first radio technology and another radio technology;
means for identifying whether said detected interference is related to communications with said first base station or to communications with said second base station; and
means for controlling the operating of said transceiver circuitry using said first configuration data if said means for identifying identifies that the interference is related to communications with said first base station and for controlling the operating of said transceiver circuitry using said second configuration data if said means for identifying identifies that the interference is related to communications with said second base station.

(Supplementary Note 2) A user device according to the supplementary note 1, wherein said means for receiving is arranged to receive said first and second configuration data in a single configuration message transmitted from the first base station or to receive said first and second configuration data in different configuration messages transmitted from the first base station at different times.

(Supplementary Note 3) A user device according to the supplementary note 1 or 2, wherein said first and second configuration data comprises a respective set of one or more autonomous denial parameters.

(Supplementary Note 4) A user device according to any of the supplementary notes 1 to 3, wherein in the event that the user device determines that controlling of the transceiver circuitry does not address the interference, the user device is arranged to transmit a coexistence message to the first base station and wherein the coexistence message identifies a subset of cells currently serving the user device by said first and second base stations.

(Supplementary Note 5) A user device according to the supplementary note 4, wherein if said means for identifying identifies that the interference is related to communications with said first base station, said coexistence message identifies only the cells of the first base station to which the interference relates.

(Supplementary Note 6) A user device according to the supplementary note 4, wherein if said means for identifying identifies that the interference is related to communications with said second base station, said coexistence message identifies only the cells of the second base station to which the interference relates.

(Supplementary Note 7) A user device according to the supplementary note 4, wherein if said means for identifying identifies that the interference is related to communications with both said first base station and said second base station, said coexistence message identifies the cells of the first base station and the cells of the second base station to which the interference relates.

(Supplementary Note 8) A user device according to the supplementary note 7, wherein the user device is configured to include first assistance information in said coexistence message relating to parameters of the interference for use by said first base station to address the interference and to include second assistance information in said coexistence message relating to parameters of the interference for use by said second base station to address the interference.

(Supplementary Note 9) A user device comprising:

transceiver circuitry configured to communicate control plane data with a first base station and user plane data with a second base station using a first radio technology;

means for receiving first configuration data from the first base station, the first configuration data for configuring the user device to try to reduce interference arising as a result of communicating with said first base station and the coexistence of said first radio technology and another radio technology;

means for detecting interference arising as a result of the coexistence of said first radio technology and another radio technology;

means for identifying whether said detected interference is related to communications with said first base station or to communications with said second base station; and means for controlling the operating of said transceiver circuitry using said first configuration data if said means for identifying identifies that the interference is related to communications with said first base station and for either: i) taking no action; or ii) for reporting the interference to the second base station via the first base station, if said means for identifying identifies that the interference is related to communications with said second base station.

(Supplementary Note 10) A secondary base station device configured to provide user plane connectivity to a user device whilst control plane connectivity is provided to the user device by a master base station device, the secondary base station device comprising:

a base station interface for communicating with the master base station device; and a control module configured to generate configuration data for configuring the user device to try to reduce interference arising as a result of communicating with the secondary base station device and the coexistence of an interfering signal for transmission to the user device and configured to transmit the control data to the master base station device via the base station interface;

wherein the control module is arranged to receive a coexistence message from the master base station device identifying interference on one or more cells of the secondary base station device used to communicate said user plane data with the user device and is arranged to generate new configuration data for the user device to reduce the interference and to send the new configuration data to the user device via the master base station device over said base station interface.

(Supplementary Note 11) A master base station device configured to provide control plane connectivity to a user device whilst user plane connectivity is provided to the user device by a secondary base station device, the master base station device comprising:

transceiver circuitry for communicating control data with said user device;

a base station interface for communicating with the secondary base station device; and a control module configured to send first and second configuration data to the user device, the first configuration data for configuring the user device to try to reduce interference arising as a result of communicating with said master base station device and the coexistence of an interfering signal and the second configuration data for configuring the user device to try to reduce interference arising as a result of communicating with said secondary base station device and the coexistence of an interfering signal.

(Supplementary Note 12) A master base station device according to the supplementary note 11, wherein the control module is configured to receive the second configuration data from the secondary base station over said base station interface.

(Supplementary Note 13) A master base station device configured to provide control plane connectivity to a user device whilst user plane connectivity is provided to the user device by a secondary base station device, the master base station device comprising:

transceiver circuitry for communicating control data with said user device;

a base station interface for communicating with the secondary base station device; and a control module configured to send first configuration data to the user device, the first configuration data for configuring the user device to try to reduce interference arising as a result of communicating with said master base station device and the coexistence of an interfering signal; configured to receive a coexistence message from the user device, the coexistence message identifying one or more cells of said secondary base station device that are currently serving the user device and that are subject to interference; and configured to send a control message to the secondary base station device identifying the one or more cells of the secondary base station device that are subject to interference.

(Supplementary Note 14) A master base station device configured to provide control plane connectivity to a user device whilst user plane connectivity is provided to the user device by a secondary base station device, the master base station device comprising:

transceiver circuitry for communicating control data with said user device;

a base station interface for communicating with the secondary base station device; and a control module configured to send first configuration data to the user device, the first configuration data for configuring the user device to try to reduce interference arising as a result of communicating with said master base station device and the coexistence of an interfering signal; and configured to receive a coexistence message from the user device, the coexistence message including assistance information for a subset of cells currently serving the user device.

(Supplementary Note 15) A master base station according to the supplementary note 14, wherein the coexistence message comprises: i) assistance information only for cells of the master base station device; or ii) comprises assistance information only for cells of the secondary base station device; or iii) comprises a first information element providing assistance information only for cells of the master base station device and a second information element providing assistance information only for cells of the secondary base station device.

(Supplementary Note 16) A master base station according to the supplementary note 14 or 15, further configured to send the user device second configuration data received from the secondary base station, the second configuration data for configuring the user device to try to reduce interference arising as a result of communicating with said secondary base station device and the coexistence of an interfering signal.

(Supplementary Note 17) A secondary base station device configured to provide user plane connectivity to a user device whilst control plane connectivity is provided to the user device by a master base station device, the secondary base station device comprising:

a base station interface for communicating with the master base station device; and a control module configured to initiate a counter check procedure for a radio bearer associated with the user device and terminated in the secondary base station by generating control data for transmission to the user device and by transmitting the control data to the master base station device via the base station interface, the control data comprising at least one count value indicating an amount of data transmitted to or received from the user device on the radio bearer for use in checking for packet insertion by another device;

wherein the control module is arranged to receive a counter check response message from the user device via the master base station device over said base station interface and is arranged to process the response message to determine whether or not a security breach has occurred and if so, to initiate a bearer release procedure.

(Supplementary Note 18) A secondary base station according to the supplementary note 17, wherein the control data comprises a radio resource control, RRC, message for the user device requesting the user device to verify the amount of data received by or transmitted from the user device on the radio bearer.

(Supplementary Note 19) A secondary base station device according to the supplementary note 17 or 18, wherein the control module is arranged to initiate the bearer release procedure by sending a message to the master base station device via the base station interface, requesting that the master base station release the radio bearer and/or to allocate a new radio bearer.

(Supplementary Note 20) A master base station device configured to provide control plane connectivity to a user device whilst user plane connectivity is provided to the user device by a secondary base station device, the master base station device comprising:

a base station interface for communicating with the secondary base station device; and a control module configured to receive control data relating to the user device from the secondary base station device over the base station interface, the control data for initiating a counter check procedure for a radio bearer associated with the user device and terminated in the secondary base station, the control data comprising at least one count value indicating an amount of data transmitted to or received from the user device on the radio bearer for use in checking for packet insertion by another device; wherein the control module is further configured to generate a counter check control message containing said at least one count value for transmission to the user device to cause the user device to perform a counter check procedure; and transceiver circuitry for transmitting the counter check control message to the user device, for receiving a counter check response from the user device and for transmitting the counter check response to the secondary base station device via said base station interface.

(Supplementary Note 21) A master base station according to the supplementary note 20, wherein the control module is configured to receive a bearer release request from the secondary base station and is configured to release the requested bearer and/or to allocate a new radio bearer between the secondary base station and the user device.

(Supplementary Note 22) A master base station device according to the supplementary note 20 or 21, wherein the control module is arranged to cipher the counter check control message containing the at least one count value from the secondary base station device.

(Supplementary Note 23) A master base station device configured to provide control plane connectivity to a user device whilst user plane connectivity is provided to the user device by a secondary base station device, the master base station device comprising:

a base station interface for communicating with the secondary base station device; and a control module configured, in the event that the secondary base station device does not initiate a self-organising network, SON, user device information request procedure, to generate and transmit to the user device a SON user device information request for random access channel, RACH, statistics, the SON user device information request indicating that RACH statistics are required relating to communications with a subset of cells operated by the master base station or the secondary base station.

(Supplementary Note 24) A master base station according to the supplementary note 23, wherein the control module is arranged to generate and transmit to the user device a SON user device information request for random access channel, RACH, statistics, the SON user device information request indicating that RACH statistics are required relating to communications with cells operated by the master base station but not cells operated by the secondary base station.

(Supplementary Note 25) A master base station according to the supplementary note 24, wherein the control module is arranged to receive a RACH report from the user device specifying successful RACH procedures performed in respect of cells of the master base station.

(Supplementary Note 26) A master base station according to the supplementary note 25, wherein the RACH report does not include statistics for RACH procedures relating to cells of the secondary base station.

(Supplementary Note 27) A user device comprising:

transceiver circuitry configured to communicate control plane data with a first base station and user plane data with a second base station using a first radio technology;

means for receiving a self-organising network, SON, user device information request message from the first base station, the SON user device information request message requesting the user device to generate and transmit to the first base station random access channel, RACH, statistics, the SON user device information request indicating that RACH statistics are required relating to communications with a subset of cells serving the user device;

means for collecting RACH statistics for the subset of cells; and means for reporting the RACH statistics for the subset of cells to the first base station.

(Supplementary Note 28) A user device according to the supplementary note 27, wherein the SON user device information request message indicates that RACH statistics are required relating to communications with cells operated by the first base station but not cells operated by the second base station.

(Supplementary Note 29) A user device according to the supplementary note 28, configured to exclude collection of RACH statistics in relation to cells operated by the second base station.

(Supplementary Note 30) A user device according to the supplementary note 27, 28 or 29, wherein the RACH report does not include statistics for RACH procedures relating to cells of the second base station.

(Supplementary Note 31) A master base station device configured to provide control plane connectivity to a user device whilst user plane connectivity is provided to the user device by a secondary base station device, the master base station device comprising:
 a base station interface for communicating with the secondary base station device; and
 means for receiving a desired multimedia broadcast/multicast service, MBMS, interest indication message from the user device;
 means for determining that the MBMS service is to be provided by a cell of the secondary base station which is not currently serving the user device;
 means for sending the MBMS interest indication message to the secondary base station;
 means for adding the cell that will provide the MBMS service to a group of secondary base station cells that are currently serving the user device or for handing over the user device from a current serving cell of the secondary base station to the secondary base station cell that will provide the MBMS service.

(Supplementary Note 32) A secondary base station device configured to provide user plane connectivity to a user device whilst control plane connectivity is provided to the user device by a master base station device, the secondary base station device comprising:
 a base station interface for communicating with the master base station device;
 means for receiving a desired multimedia broadcast/multicast service, MBMS, interest indication message from the user device from the master base station device; and
 means for adding the cell that will provide the MBMS service to a group of secondary base station cells that are currently serving the user device or for changing a current serving cell for the user device to the secondary base station cell that will provide the MBMS service.

(Supplementary Note 33) A user device comprising:
 transceiver circuitry arranged to communicate control plane data with a first base station and user plane data with a second base station;
 means for receiving configuration data from the first base station, the configuration data for configuring the user device to make measurements on different frequencies corresponding to cells selected by the first base station and cells selected by the second base station;
 means for making measurements on the frequencies defined by the configuration data; and
 means for reporting measurement results relating to the measurements of the different frequencies corresponding to cells selected by said first base station and said second base station.

(Supplementary Note 34) A secondary base station device configured to provide user plane connectivity to a user device whilst control plane connectivity is provided to the user device by a master base station device, the secondary base station device comprising:
 a base station interface for communicating with the master base station device; and
 a control module arranged to generate configuration data for configuring the user device to perform measurements in relation to cells selected by the secondary base station and configured to send the configuration data to the first base station over said base station interface; and
 wherein the control module is arranged to receive a measurement report from the master base station device identifying the measurement results made by the user device in accordance with the configuration data sent by the secondary base station.

(Supplementary Note 35) A master base station device configured to provide control plane connectivity to a user device whilst user plane connectivity is provided to the user device by a secondary base station device, the master base station device comprising:
 transceiver circuitry for communicating control data with said user device;
 a base station interface for communicating with the secondary base station device; and
 a control module configured to send first and second configuration data to the user device, the first configuration data for configuring the user device to make measurements on cells for the master base station and the second configuration data for configuring the user device to make measurements on cells for the secondary base station.

(Supplementary Note 36) A master base station device according to the supplementary note 35, wherein the control module is arranged to receive a measurement report from the user device, the measurement report including measurements obtained in response to the first configuration data and measurements obtained in response to the second configuration data and is arranged to send the secondary base station at least the measurements corresponding to the second configuration data.

(Supplementary Note 37) A master base station device according to the supplementary note 35 or 36, wherein the control module is arranged to combine the first and second configuration data into common configuration data and to transmit the common configuration data to the user device.

(Supplementary Note 38) A user device comprising:
 transceiver circuitry arranged to communicate control plane data with a first base station and user plane data with a second base station;
 means for receiving, from the first base station, a radio resource control, RRC, message providing reconfiguration data for reconfiguring the user device with respect to at least one of the first base station and the second base station;
 means for determining if the user device is able to comply with the reconfiguration message; and
 means for performing an RRC re-establishment in the case that the user device determines that it cannot comply with the reconfiguration message.

(Supplementary Note 39) A secondary base station device configured to provide user plane connectivity to a user device whilst control plane connectivity is provided to the user device by a master base station device, the secondary base station device comprising:
 a base station interface for communicating with the master base station device; and
 a control module arranged to generate radio resource control, RRC, reconfiguration data for reconfiguring the operation of user device with respect to the secondary base station; and wherein the control module is arranged to send the RRC reconfiguration data to the first base station for transmission to the user device.

(Supplementary Note 40) A master base station device configured to provide control plane connectivity to a user device whilst user plane connectivity is provided to the user device by a secondary base station device, the master base station device comprising:

transceiver circuitry for communicating control data with said user device;

a base station interface for communicating with the secondary base station device; and a control module configured to send a radio resource control, RRC, reconfiguration message to the user device, the RRC reconfiguration message for reconfiguring the operation of the user device with respect to either or both of the master base station and the secondary base station.

(Supplementary Note 41) A master base station device according to the supplementary note 40, wherein said control module is arranged to receive RRC reconfiguration data from the secondary base station device and configured to include the RRC reconfiguration data in the RRC reconfiguration message.

(Supplementary Note 42) A user device comprising:

transceiver circuitry for communicating with a first and a second base station using a first radio technology, wherein said transceiver circuitry is operable to communicate control data via said first base station and to communicate user data via said second base station;

means for obtaining configuration data for alleviating interference arising as a result of communicating via said first base station and the coexistence of said first radio technology and a second radio technology;

means for detecting interference arising as a result of the coexistence of said first radio technology and a second radio technology, and means for identifying whether said detected interference is related to said first or said second base station; and means for providing, to said first base station and responsive to identifying that said interference is related to said second base station, information identifying said detected interference arising as a result of the coexistence of said first radio technology and a second radio technology; and wherein said transceiver circuitry is operable to control communication with the first base station, based on said configuration data and responsive to identifying that said interference is related to said first base station to try to alleviate the detected interference.

(Supplementary Note 43) The user device according to the supplementary note 42, further comprising means for obtaining configuration data for alleviating interference arising as a result of communicating via said second base station and the coexistence of said first radio technology and a second radio technology; and wherein, prior to providing said information identifying said detected interference arising as a result of the coexistence of said first radio technology and a second radio technology, said transceiver circuitry is operable to control communication with the second base station, based on said configuration data and responsive to identifying that said interference is related to said second base station, to try to alleviate the detected interference.

(Supplementary Note 44) The user device according to the supplementary note 42 or 43, further comprising means for providing, to said first base station and responsive to identifying that said interference is related to said first base station, information identifying said detected interference arising as a result of the coexistence of said first radio technology and a second radio technology, if said transceiver circuitry fails to alleviate said interference related to said first base station based on said configuration data.

(Supplementary Note 45) The user device according to any of the supplementary notes 42 to 44, wherein said providing means is operable to send a Radio Resource Control, RRC, message to said first base station, said RRC message comprising said information identifying said detected interference arising as a result of the coexistence of said first radio technology and a second radio technology.

(Supplementary Note 46) The user device according to any of the supplementary notes 42 to 45, wherein said information identifying said first base station comprises at least one frequency associated with said first and/or said second base station.

(Supplementary Note 47) The user device according to any of the supplementary notes 42 to 46, wherein said configuration data comprises 'idc-config' data.

(Supplementary Note 48) The user device according to any of the supplementary notes 42 to 47, wherein said information identifying said detected interference arising as a result of the coexistence of said first radio technology and a second radio technology comprises information identifying an affected frequency.

(Supplementary Note 49) A base station device comprising:

transceiver circuitry for communicating with a user device using a first radio technology and for communicating with another base station device, wherein said base station device is operable to communicate control data with said user device and said other base station device is operable to communicate user data with said user device;

means for obtaining configuration data for alleviating interference arising as a result of communicating via said base station device and the coexistence of said first radio technology and a second radio technology;

means for obtaining, from said other base station device, further configuration data for alleviating interference arising as a result of communicating via said other base station device and the coexistence of said first radio technology and a second radio technology;

means for providing said configuration data and said further configuration data to said user device for alleviating interference arising as a result of communicating via said base station device and the coexistence of said first radio technology and a second radio technology; and means for obtaining, from said user device, information identifying interference arising as a result of the coexistence of said first radio technology and a second radio technology and information identifying whether said interference is related to said first or said second base station device.

(Supplementary Note 50) A method performed by a user device configured to communicate control plane data with a first base station and user plane data with a second base station using a first radio technology, the method comprising:

receiving first and second configuration data from the first base station, the first configuration data for configuring the user device to try to reduce interference arising as a result of communicating with said first base station and the coexistence of said first radio technology and another radio technology and the second configuration data for configuring the user device to try to reduce interference arising as a result of communicating with said second base station and the coexistence of said first radio technology and another radio technology;

detecting interference arising as a result of the coexistence of said first radio technology and another radio technology;

identifying whether said detected interference is related to communications with said first base station or to communications with said second base station; and controlling the operating of said transceiver circuitry:
i) using said first configuration data if said identifying identifies that the interference is related to communications with said first base station; and
ii) using said second configuration data if said identifying identifies that the interference is related to communications with said second base station.

(Supplementary Note 51) The method according to the supplementary note 50, wherein said receiving step comprises: i) receiving said first and second configuration data in a single configuration message transmitted from the first base station; or ii) receiving said first and second configuration data in different configuration messages transmitted from the first base station at different times.

(Supplementary Note 52) The method according to the supplementary note 50 or 51, further comprising:

determining that controlling of the transceiver circuitry does not address the interference; and transmitting a coexistence message to the first base station, wherein the coexistence message identifies a subset of cells currently serving the user device by said first and second base stations.

(Supplementary Note 53) The method according to the supplementary note 52, wherein if said identifying identifies that the interference is related to communications with said first base station, said coexistence message identifies only the cells of the first base station to which the interference relates.

(Supplementary Note 54) The method according to the supplementary note 52, wherein if said identifying identifies that the interference is related to communications with said second base station, said coexistence message identifies only the cells of the second base station to which the interference relates.

(Supplementary Note 55) The method according to the supplementary note 52, wherein if said identifying identifies that the interference is related to communications with both said first base station and said second base station, said coexistence message identifies the cells of the first base station and the cells of the second base station to which the interference relates.

(Supplementary Note 56) A method performed by a user device configured to communicate control plane data with a first base station and user plane data with a second base station using a first radio technology, the method comprising:

receiving first configuration data from the first base station, the first configuration data for configuring the user device to try to reduce interference arising as a result of communicating with said first base station and the coexistence of said first radio technology and another radio technology;

detecting interference arising as a result of the coexistence of said first radio technology and another radio technology;

identifying whether said detected interference is related to communications with said first base station or to communications with said second base station; and controlling the operating of said transceiver circuitry using said first configuration data if said means for identifying identifies that the interference is related to communications with said first base station and either: i) taking no action; or ii) reporting the interference to the second base station via the first base station, if said identifying identifies that the interference is related to communications with said second base station.

(Supplementary Note 57) A method performed by a secondary base station device configured to provide user plane connectivity to a user device whilst control plane connectivity is provided to the user device by a master base station device, the method comprising:

generating configuration data for configuring the user device to try to reduce interference arising as a result of communicating with the secondary base station device and the coexistence of an interfering signal for transmission to the user device;

transmitting the control data to the master base station device via a base station interface;

receiving a coexistence message from the master base station device identifying interference on one or more cells of the secondary base station device used to communicate said user plane data with the user device; and generating new configuration data for the user device to reduce the interference and sending the new configuration data to the user device via the master base station device over said base station interface.

(Supplementary Note 58) A method performed by a master base station device configured to provide control plane connectivity to a user device whilst user plane connectivity is provided to the user device by a secondary base station device, the method comprising:

sending first and second configuration data to the user device, the first configuration data for configuring the user device to try to reduce interference arising as a result of communicating with said master base station device and the coexistence of an interfering signal and the second configuration data for configuring the user device to try to reduce interference arising as a result of communicating with said secondary base station device and the coexistence of an interfering signal.

(Supplementary Note 59) The method according to the supplementary note 58, further comprising receiving the second configuration data from the secondary base station over a base station interface, prior to sending said first and second configuration data to the user device.

(Supplementary Note 60) A method performed by a master base station device configured to provide control plane connectivity to a user device whilst user plane connectivity is provided to the user device by a secondary base station device, the method comprising:

sending first configuration data to the user device, the first configuration data for configuring the user device to try to reduce interference arising as a result of communicating with said master base station device and the coexistence of an interfering signal;

receiving a coexistence message from the user device, the coexistence message identifying one or more cells of said secondary base station device that are currently serving the user device and that are subject to interference; and sending a control message to the secondary base station device identifying the one or more cells of the secondary base station device that are subject to interference.

(Supplementary Note 61) A method performed by a master base station device configured to provide control plane connectivity to a user device whilst user plane connectivity is provided to the user device by a secondary base station device, the method comprising:

sending first configuration data to the user device, the first configuration data for configuring the user device to try to reduce interference arising as a result of communicating with said master base station device and the coexistence of an interfering signal; and receiving a coexistence message from the user device, the coexistence message including assistance information for a subset of cells currently serving the user device.

(Supplementary Note 62) The method according to the supplementary note 61, further comprising receiving second configuration data from the secondary base station, the second configuration data for configuring the user device to try to reduce interference arising as a result of communicating with said secondary base station device and the coexistence of an interfering signal; and sending the user device said second configuration data received from the secondary base station.

(Supplementary Note 63) A method performed by a secondary base station device configured to provide user plane connectivity to a user device whilst control plane connectivity is provided to the user device by a master base station device, the secondary base station device comprising:

a base station interface for communicating with the master base station device; and a control module configured to initiate a counter check procedure for a radio bearer associated with the user device and terminated in the secondary base station by generating control data for transmission to the user device and by transmitting the control data to the master base station device via the base station interface, the control data comprising at least one count value indicating an amount of data transmitted to or received from the user device on the radio bearer for use in checking for packet insertion by another device;

wherein the control module is arranged to receive a counter check response message from the user device via the master base station device over said base station interface and is arranged to process the response message to determine whether or not a security breach has occurred and if so, to initiate a bearer release procedure.

(Supplementary Note 64) The method according to the supplementary note 63, further comprising initiating the bearer release procedure by sending a message to the master base station device via the base station interface, requesting that the master base station release the radio bearer and/or to allocate a new radio bearer.

(Supplementary Note 65) A method performed by a master base station device configured to provide control plane connectivity to a user device whilst user plane connectivity is provided to the user device by a secondary base station device, the method comprising:

receiving control data relating to the user device from the secondary base station device over a base station interface, the control data for initiating a counter check procedure for a radio bearer associated with the user device and terminated in the secondary base station, the control data comprising at least one count value indicating an amount of data transmitted to or received from the user device on the radio bearer for use in checking for packet insertion by another device;

generating a counter check control message containing said at least one count value for transmission to the user device to cause the user device to perform a counter check procedure; and transmitting the counter check control message to the user device, for receiving a counter check response from the user device and for transmitting the counter check response to the secondary base station device via said base station interface.

(Supplementary Note 66) The method according to the supplementary note 65, further comprising ciphering the counter check control message containing the at least one count value from the secondary base station device.

(Supplementary Note 67) A method performed by a master base station device configured to provide control plane connectivity to a user device whilst user plane connectivity is provided to the user device by a secondary base station device, the method comprising:

in the event that the secondary base station device does not initiate a self-organising network, SON, user device information request procedure, generating and transmitting to the user device a SON user device information request for random access channel, RACH, statistics, the SON user device information request indicating that RACH statistics are required relating to communications with a subset of cells operated by the master base station or the secondary base station.

(Supplementary Note 68) A method performed by a user device configured to communicate control plane data with a first base station and user plane data with a second base station using a first radio technology, the method comprising:

receiving a self-organising network, SON, user device information request message from the first base station, the SON user device information request message requesting the user device to generate and transmit to the first base station random access channel, RACH, statistics, the SON user device information request indicating that RACH statistics are required relating to communications with a subset of cells serving the user device;

collecting RACH statistics for the subset of cells; and reporting the RACH statistics for the subset of cells to the first base station.

(Supplementary Note 69) A method performed by a master base station device configured to provide control plane connectivity to a user device whilst user plane connectivity is provided to the user device by a secondary base station device, the method comprising:

receiving a desired multimedia broadcast/multicast service, MBMS, interest indication message from the user device;

determining that the MBMS service is to be provided by a cell of the secondary base station which is not currently serving the user device;

sending the MBMS interest indication message to the secondary base station; and adding the cell that will provide the MBMS service to a group of secondary base station cells that are currently serving the user device or handing over the user device from a current serving cell of the secondary base station to the secondary base station cell that will provide the MBMS service.

(Supplementary Note 70) A method performed by a secondary base station device configured to provide user plane connectivity to a user device whilst control plane connectivity is provided to the user device by a master base station device, the method comprising:

receiving a desired multimedia broadcast/multicast service, MBMS, interest indication message from the user device from the master base station device; and adding the cell that will provide the MBMS service to a group of secondary base station cells that are currently serving the user device or changing a current serving cell for the user device to the secondary base station cell that will provide the MBMS service.

(Supplementary Note 71) A method performed by a user device arranged to communicate control plane data with a first base station and user plane data with a second base station, the method comprising:

receiving configuration data from the first base station, the configuration data for configuring the user device to make measurements on different frequencies corresponding to cells selected by the first base station and cells selected by the second base station;

making measurements on the frequencies defined by the configuration data; and reporting measurement results relating to the measurements of the different frequencies corresponding to cells selected by said first base station and said second base station.

(Supplementary Note 72) A method performed by a secondary base station device configured to provide user plane connectivity to a user device whilst control plane connectivity is provided to the user device by a master base station device, the method comprising:

generating configuration data for configuring the user device to perform measurements in relation to cells selected by the secondary base station;

sending the configuration data to the first base station over a base station interface; and receiving a measurement report from the master base station device identifying the measurement results made by the user device in accordance with the configuration data sent by the secondary base station.

(Supplementary Note 73) A method performed by a master base station device configured to provide control plane connectivity to a user device whilst user plane connectivity is provided to the user device by a secondary base station device, the method comprising:

sending first and second configuration data to the user device, the first configuration data for configuring the user device to make measurements on cells for the master base station and the second configuration data for configuring the user device to make measurements on cells for the secondary base station.

(Supplementary Note 74) The method according to the supplementary note 73, further comprising receiving a measurement report from the user device, the measurement report including measurements obtained in response to the first configuration data and measurements obtained in response to the second configuration data; and sending the secondary base station at least the measurements corresponding to the second configuration data.

(Supplementary Note 75) A method performed by a user device arranged to communicate control plane data with a first base station and user plane data with a second base station, the method comprising:

receiving, from the first base station, a radio resource control, RRC, message providing reconfiguration data for reconfiguring the user device with respect to at least one of the first base station and the second base station;

determining if the user device is able to comply with the reconfiguration message; and performing an RRC re-establishment in the case that the user device determines that it cannot comply with the reconfiguration message.

(Supplementary Note 76) A method performed by a secondary base station device configured to provide user plane connectivity to a user device whilst control plane connectivity is provided to the user device by a master base station device, the method comprising:

generating radio resource control, RRC, reconfiguration data for reconfiguring the operation of user device with respect to the secondary base station; and sending the RRC reconfiguration data to the first base station for transmission to the user device.

(Supplementary Note 77) A computer implementable instructions product comprising computer implementable instructions for causing a programmable communications device to perform the method of any of the supplementary notes 50 to 76.

This application is based upon and claims the benefit of priority from United Kingdom patent application No. 1401701.6, filed on Jan. 31, 2014, the disclosure of which is incorporated herein in its entirety by reference.

What is claimed is:

1. A master base station device comprising:
    a transceiver circuit configured to communicate with a secondary base station device and provide control plane connectivity to a user device whilst user plane connectivity is provided to the user device by the secondary base station device;
    wherein the transceiver circuit is further configured to receive a desired multimedia broadcast/multicast service, MBMS, interest indication message from the user device; and
    a processor configured to determine that the MBMS service is to be provided by a cell of the secondary base station which is not currently serving the user device;
    wherein the transceiver circuit is further configured to send the MBMS interest indication message to the secondary base station; and
    wherein the processor is further configured to add the cell that will provide the MBMS service to a group of secondary base station cells that are currently serving the user device or for handing over the user device from a current serving cell of the secondary base station to the secondary base station cell that will provide the MBMS service.

2. A secondary base station device comprising:
    a transceiver circuit configured to communicate with a master base station device and provide user plane connectivity to a user device whilst control plane connectivity is provided to the user device by the master base station device;
    wherein the transceiver circuit is further configured to receive a desired multimedia broadcast/multicast service, MBMS, interest indication message from the user device from the master base station device; and
    a processor configured to add a cell that will provide the MBMS service to a group of secondary base station cells that are currently serving the user device or for changing a current serving cell for the user device to the secondary base station cell that will provide the MBMS service.

3. A method performed by a master base station device, the method comprising:
    providing control plane connectivity to a user device whilst user plane connectivity is provided to the user device by the secondary base station device;
    receiving a desired multimedia broadcast/multicast service, MBMS, interest indication message from the user device;
    determining that the MBMS service is to be provided by a cell of the secondary base station which is not currently serving the user device;
    sending the MBMS interest indication message to the secondary base station; and
    adding the cell that will provide the MBMS service to a group of secondary base station cells that are currently serving the user device or handing over the user device from a current serving cell of the secondary base station to the secondary base station cell that will provide the MBMS service.

4. A method performed by a secondary base station device, the method comprising:
   providing user plane connectivity to a user device whilst control plane connectivity is provided to the user device by the master base station device;
   receiving a desired multimedia broadcast/multicast service, MBMS, interest indication message from the user device from the master base station device; and
   adding a cell that will provide the MBMS service to a group of secondary base station cells that are currently serving the user device or changing a current serving cell for the user device to the secondary base station cell that will provide the MBMS service.

\* \* \* \* \*